US008756101B2

(12) United States Patent
Moore et al.

(10) Patent No.: US 8,756,101 B2
(45) Date of Patent: Jun. 17, 2014

(54) USER AND STREAM DEMOGRAPHICS METADATA GUIDE BASED CONTENT SERVICES

(75) Inventors: William Moore, Dallas, TX (US); Thomas Hutchings, Richardson, TX (US); David McIntosh, Dallas, TX (US); Edwin J. Lau, San Jose, CA (US)

(73) Assignee: TuneIn, Inc., Palo Alto, CA (US)

( * ) Notice: Subject to any disclaimer, the term of this patent is extended or adjusted under 35 U.S.C. 154(b) by 680 days.

(21) Appl. No.: 12/011,478

(22) Filed: Jan. 25, 2008

(65) Prior Publication Data

US 2009/0192887 A1 Jul. 30, 2009

(51) Int. Cl.
*G06F 15/16* (2006.01)
*G06Q 30/00* (2012.01)

(52) U.S. Cl.
USPC ............... 705/14.25; 705/14.56; 705/14.73; 709/231

(58) Field of Classification Search
USPC ......... 705/1.1, 1, 14, 14.56, 14.73, 37, 14.25; 709/231; 725/22, 32, 36
See application file for complete search history.

(56) References Cited

U.S. PATENT DOCUMENTS

| 6,324,519 | B1 * | 11/2001 | Eldering ..................... 705/14.66 |
| 6,763,334 | B1 * | 7/2004 | Matsumoto et al. ....... 705/14.19 |
| 6,990,498 | B2 | 1/2006 | Fenton et al. |
| 7,051,275 | B2 | 5/2006 | Gupta et al. |
| 7,130,616 | B2 * | 10/2006 | Janik ......................... 455/412.1 |
| 7,433,876 | B2 | 10/2008 | Spivack et al. |
| 7,509,340 | B2 * | 3/2009 | Fenton et al. ........................ 1/1 |
| 7,570,761 | B2 | 8/2009 | Risan et al. |
| RE41,618 | E | 8/2010 | Florschuetz |
| 7,774,431 | B2 | 8/2010 | Conn et al. |
| 7,979,880 | B2 | 7/2011 | Hosea et al. |
| 7,983,300 | B2 | 7/2011 | Vaughan et al. |
| 8,423,408 | B1 * | 4/2013 | Barnes et al. .............. 705/14.49 |
| 2002/0013852 | A1 | 1/2002 | Janik |
| 2002/0194593 | A1 * | 12/2002 | Tsuchida et al. ............... 725/32 |

(Continued)

FOREIGN PATENT DOCUMENTS

| EP | 1207696 A1 * | 5/2002 | .............. H04N 7/16 |
| WO | 2011/008188 A1 | 1/2011 | |

OTHER PUBLICATIONS

Venkatesh Shankar and marie Hollinger; "Online and Mobile Advertising: Current Scenario, Emerging Trends, and Future Directions"; Sep. 2007; pp. 1-48.*

(Continued)

*Primary Examiner* — Ella Colbert
(74) *Attorney, Agent, or Firm* — Kilpatrick Townsend & Stockton LLP

(57) ABSTRACT

A metadata guide of audio, video, multimedia transmission, receiving and playback with advertising and bi-directional fulfillment of goods and services over the Internet includes the use of user and stream demographics. A streaming content distribution system includes a a server to a) stream content based on i) user demographics and ii) historical and real time stream demographics from a plurality of streaming content sources and b) stream advertisements based on user demographics selected by advertisers, commercial agreements and access control rules from a plurality of streaming advertisement sources before, during, and after playback of streaming content from the server over the internet to a user device including a central processing unit and a physical user interface; and a guide including metadata not input by the users for the user device to locate streaming content on the server.

18 Claims, 26 Drawing Sheets

(56) References Cited

U.S. PATENT DOCUMENTS

| | | |
|---|---|---|
| 2006/0029093 A1 | 2/2006 | Van Rossum |
| 2006/0173985 A1 | 8/2006 | Moore |
| 2006/0294538 A1 | 12/2006 | Li et al. |
| 2007/0006277 A1 | 1/2007 | Mills et al. |
| 2007/0078712 A1* | 4/2007 | Ott et al. .................. 705/14 |
| 2007/0124493 A1 | 5/2007 | Fogg |
| 2007/0282987 A1* | 12/2007 | Fischer et al. ............ 709/223 |
| 2008/0060009 A1 | 3/2008 | Kelts |
| 2008/0077952 A1 | 3/2008 | St. Jean et al. |
| 2008/0091528 A1 | 4/2008 | Rampell et al. |
| 2008/0134043 A1 | 6/2008 | Georgis et al. |
| 2008/0147821 A1 | 6/2008 | Dietrich et al. |
| 2008/0313669 A1 | 12/2008 | Acharya et al. |
| 2009/0083326 A1 | 3/2009 | Pelton |
| 2009/0171715 A1* | 7/2009 | Conley et al. .................. 705/7 |
| 2009/0171749 A1 | 7/2009 | Laruelle et al. |
| 2009/0193134 A1 | 7/2009 | Moore et al. |
| 2013/0191210 A1 | 7/2013 | Moore et al. |
| 2013/0191748 A1 | 7/2013 | Moore et al. |

OTHER PUBLICATIONS

International Search Report and the Written Opinion of the International Searching Authority for International Application No. PCT/US2009/004086 mailed Aug. 25, 2009, 7 pages.

International Preliminary Report on Patentability for PCT Application No. PCT/US2009/004086, dated Jan. 17, 2012, 5 pages.

Non-Final Office Action for U.S. Appl. No. 12/011,470 mailed on Oct. 1, 2009, 13 pages.

Final Office Action for U.S. Appl. No. 12/011,470 mailed on Jun. 17, 2010, 16 pages.

Non-Final Office Action for U.S. Appl. No. 12/011,470 mailed on Dec. 20, 2011, 19 pages.

Final Office Action for U.S. Appl. No. 12/011,470 mailed on Jul. 26, 2012, 18 pages.

Notice of Allowance for U.S. Appl. No. 12/011,470 mailed on Jul. 30, 2013, 5 pages.

Non-Final Office Action for U.S. Appl. No. 13/797,774 mailed on Aug. 22, 2013, 19 pages.

Non-Final Office Action for U.S. Appl. No. 13/797,872 mailed on Nov. 29, 2013, 20 pages.

* cited by examiner

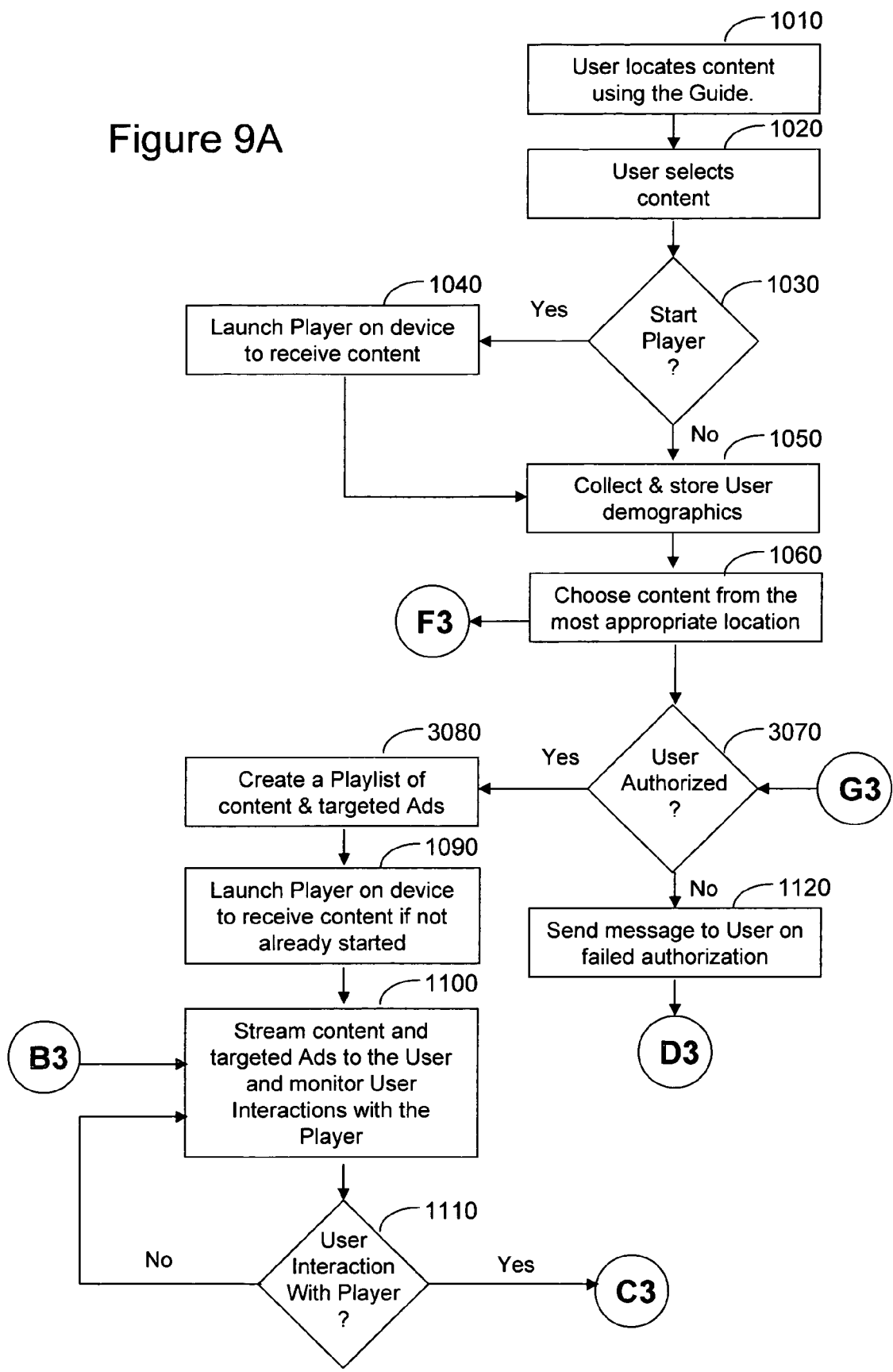

USER AND STREAM DEMOGRAPHICS METADATA GUIDE BASED CONTENT SERVICES

BACKGROUND INFORMATION

1. Field of the Invention

The invention relates in general to services provided through a guide of audio, video, multimedia transmission, receiving and playback system with advertising and bi-directional fulfillment of goods and services over the Internet. More specifically, to a system in which users select specific audio, video, and multimedia content from a plurality of Internet sources, receiving such content at the user's location using an Internet connect device where advertising targeted at the user is placed before, during, and/or after the content is played/run and with the user having the option of purchasing goods and services as a result of the advertising through the same Internet connect devices at the convenience of the user.

2. Discussion of Related Technology

Traditional content such as radio and television broadcasts have been predicated on a physical antenna located in a specific geography. Generally, this limited access of broadcast content to consumers within a specific geography enabling advertisements to be targeted at those within the broadcast range of the antenna. Furthermore, it limited the number of broadcasters in any geography to those with sufficient capital to build the physical infrastructure. In developed countries such as the United States, sophisticated statistical demographic analysis as well as polling customers in various regions of the country has been developed by companies such as Arbitron to determine what, who, and how long customers watch or listen to a broadcast. This is ultimately used to determine how much a broadcaster can charge an advertiser to present goods and services to the broadcaster's customers. Furthermore, the advertisement is generally unidirectional—that is, a broadcast advertisement message requires that an interested customer use an alternate method (e.g., travel to a store, make a telephone call to a product/services fulfillment house, send mail to a fulfillment house, etc.) to obtain the advertised goods and/or services.

Presently, with the tremendous capabilities of the Internet as a method to distribute content and as a source of customers, broadcasters and other producers of audio, video, and multimedia content have begun to make their content available to users of the Internet. Using the Internet for content distribution is very different from traditional broadcasting with respect to capital investment and geographic reach. For example, while traditional broadcasters require substantial up-front capital to build the necessary infrastructure to reach a local audience, once the infrastructure is in place, the cost of incremental customer use of the infrastructure is virtually zero. With the Internet, this is not the case. While it is relatively inexpensive to build the infrastructure to deliver content via the Internet, costs are associated with incremental customer use of the content, i.e., each individual user of an Internet stream requires incremental bandwidth and other computer/network resources. With respect to geographic reach, the Internet is without boundaries, extending the availability of the content globally. With the Internet, listening, watching, or working with content originating in Los Angeles is as easily accomplished by a customer in New York or Paris as one in Los Angeles.

The ease of establishing a presence on the Internet with the promise of a large numbers of customers has lead to hundreds of thousands of streaming content providers today. Internet content providers vary from traditional broadcasters with professionally produced content to individuals producing unique amateur content. The Internet further enables ever more sophisticated methods for user interaction with content, a direct means to collect information about the user, and a means to conduct instantaneous transactions for goods and services by users.

The explosion content streams available on the Internet and the global nature of Internet access to content have lead to fundamental problems of 1) how customers find content of interest and 2) how can advertisement be effectively run with users in multiple geographies. In the United States alone, traditional radio stations making their broadcast streams available on the Internet today number in the tens of thousands, making regional call letters for stations almost obsolete and local advertisements ineffective for Internet listeners outside of the original broadcast geography.

SUMMARY OF THE INVENTION

The present invention realizes the potential of the Internet for users, content providers, and advertisers. The invention answers many of the aforementioned problems for user and Internet content providers by providing a system and method to effectively find and stream Internet accessible content with advertisements targeted to the user without knowing a priori, from where the user may be accessing such content. Furthermore, it defines a method for fulfilling advertised goods and services during playback/use of content.

In the first embodiment of the invention, a system with a content guide, a single control/access point for content streams and a single control/access point for advertisement, and a module for fulfillment is contemplated. Within the system, a method for user access and playback of content and targeted advertisement as well as a way to fulfill goods and services associated user initiated actions as a result of targeted advertisements are described.

In the second embodiment of the invention, a system with a content guide, multiple control/access points for content streams and a single control, access point for advertisement, and a module for fulfillment is contemplated. Within the system, a method for user access and playback of content and targeted advertisement as well as a way to fulfill goods and services associated user initiated actions as a result of targeted advertisements are described.

In the third embodiment of the invention, a system with a content guide, a single control and access point for content streams and multiple control/access points for advertisement, and a module for fulfillment is contemplated. Within the system, a method for user access and playback of content and targeted advertisement as well as a way to fulfill goods and services associated user initiated actions as a result of targeted advertisements are described.

In the fourth embodiment of the invention, a system with a content guide, a single control/access point for content streams and multiple control/access points for advertisement, and a module for fulfillment is contemplated. Within the system, a method for user access and playback of content and targeted advertisement as well as a way to fulfill goods and services associated user initiated actions as a result of targeted advertisements are described. Additionally, targeted advertisements are selected using a marketplace where the content streams owners may accept bids from advertisers for how much they are willing to pay to place advertisements on before, during, and content stream playback.

In the fifth embodiment of the invention, a system with a content guide, multiple control and access points for content streams and multiple control, access points for advertisement, and a module for fulfillment is contemplated. Within the system, a method for user access and playback of content and targeted advertisement as well as a way to fulfill goods and services associated user initiated actions as a result of targeted advertisements are described.

Finally, the sixth embodiment of the invention, a system with a content guide, multiple control and access points for content streams and multiple control, access points for advertisement, and a module for fulfillment is contemplated. Within the system, a method for user access and playback of content and targeted advertisement as well as a way to fulfill goods and services associated with user initiated actions as a result of targeted advertisements are described. Additionally, targeted advertisements are selected using a marketplace where the content streams owners may accept bids from advertisers for how much they are willing to pay to place advertisements on before, during, and content stream playback.

BRIEF DESCRIPTION OF THE DRAWINGS

FIG. 9A outlines the steps of the process associated with users 100, 110 selections from a plurality of Content Streams 502 and Ad Streams 612, 622, 632 using data from Guide 300. This figure is associated with the system shown in FIG. 3.

DETAILED DESCRIPTION OF PREFERRED EMBODIMENT

Figure 1:
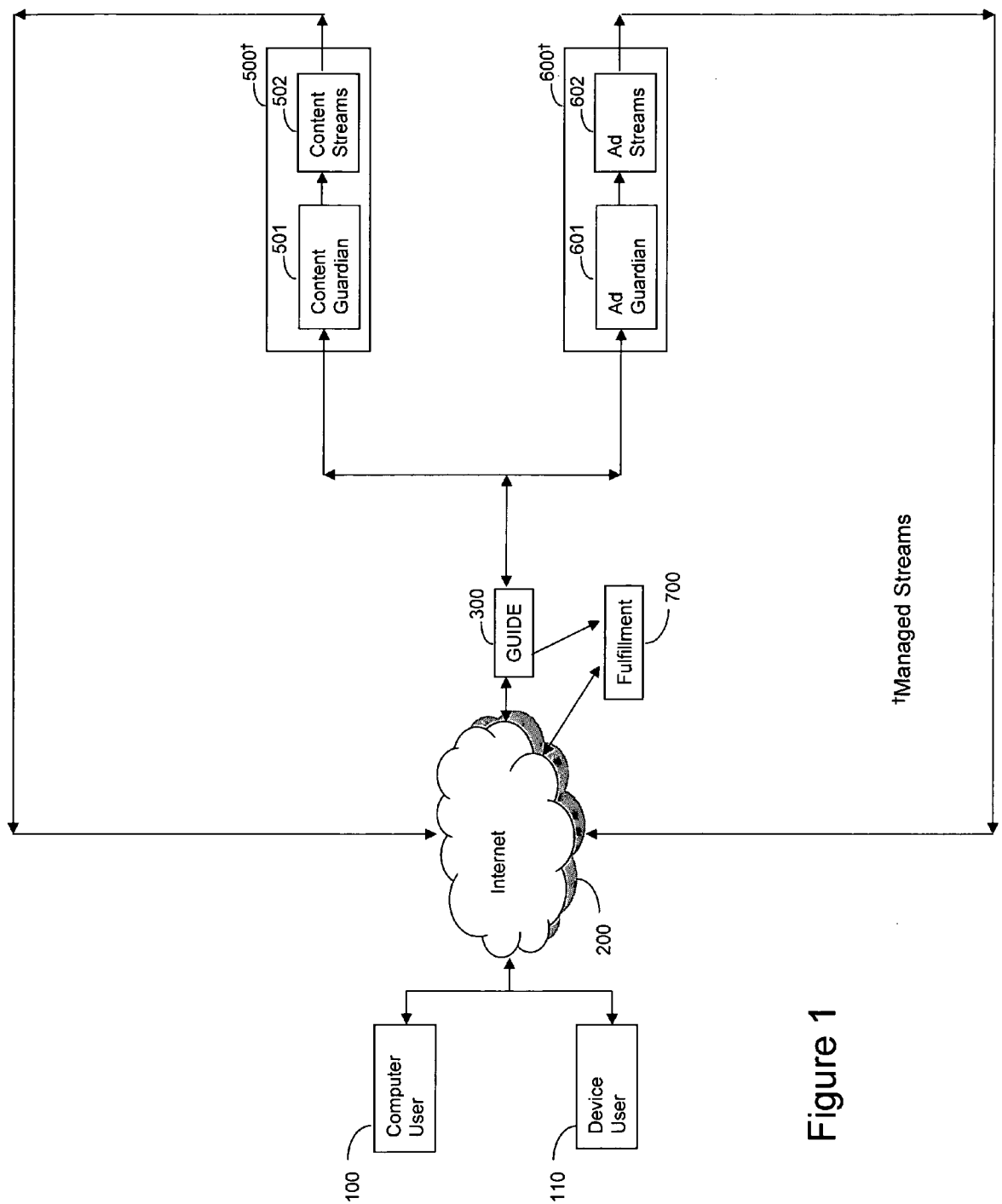
FIG. 1 is a diagram the system having users 100, 110, the Internet 200, the Guide 300, Managed Content 500 with a single Content Guardian 501 and a single Content Streams 502 (made up of a plurality of content streams), Managed Ads 600 with a single Ad Guardian 601 and a single Ad Streams 602 (made up of a plurality of Ad streams), and Fulfillment 700.

The elements of the content services in accordance with the invention can essentially be divided into four distinct components: user module 100 and 110, guide module 300, stream modules 500 and 600, and a fulfillment module 700, as illustrated in FIG. 1.

The system enables users to playback content available on the Internet 200 in such a way that the owners of such content may be paid by advertisers and others wishing to make their goods and services available to users of the system. Content as described herein, is defined as audible, visual, and/or multimedia streams or programs found on the Internet with which a person can hear, see, and interact. A user may select and navigate through text, audio, streams, video streams, and multi-media programs. Multi-media programs are defined as interactive programs that may run on a device with a central processing unit, accepting user input and displaying output such as text, audio, video, graphics that may change over time.

In the preferred embodiment, the system is driven through a Guide 300 of content made available to users over the Internet. Computer Users 100 and Device Users 110, access a Guide 300 of Managed Content Streams 500. The Managed Content Stream 500 include a Content Guardian 501 authorizing, controlling access, and holding limited or complete copyright to Content Streams 502 which may be text, audio and video streams, and multimedia content published and available on the Internet. Content access control includes the ability to selectively enable access to content streams by user attribute, playback device type, content player attributes, commercial relationship, etc. Examples of Content Guardian 501 include radio and television networks, individual radio stations, etc. Content Streams 502 is made up of a plurality of individual content streams, each selectable for playback by a user. Examples of such content are radio broadcast streams, podcasts, television broadcast streams, and video podcasts. The Managed Ad Streams 600 are made up of an Ad Guardian 601 which authorizes, controls access, and holds limited or complete copyright to the Ad Streams 602 which may be made up of audio, video, and multimedia advertising streams. Ad stream access control includes the ability to selectively enable access to ad streams by user attribute, playback device type, content player attributes, commercial relationship, etc. Content Guardians include companies such as Ando Media, CBS Radio, and Akamai Networks. The Ad Streams 602 for the advertisers goods and services are linked to content streams through commercial agreements between advertisers/advertisers agents and Content Guardians 501 for payment (e.g., money, in kind goods and services, etc.) when advertisements are played/run before, during, and after playback/running of Content Streams 502 for Computer Users 100 and Device Users 110. Content Guardian 501 are linked to Ad Guardian 601 through a commercial or wholly owned relationship which enables advertisements to be included within Ad Streams 602 following the formalized commercial agreement between advertisers and Content Guardians 501.

Computer Users 100 and Device Users 110 interacting with the content may request Fulfillment 700, i.e., the purchase, rental, request for information, etc. of goods and services presented to the Computer Users 100 and Device Users 110 during interaction with the content. Computer Users 100 and Device Users 110 requests to Fulfillment 700 represent a bidirectional interaction over the Internet and are encrypted when privacy and security are important. For example, when a user purchases goods and/or services through a credit card or other electronic payment systems such as PayPal or Google Payment through Fulfillment 700, the purchase transaction will be encrypted using SSL or PKI.

The Guide 300 contains data such as the name of the content, the time at which the content is available, a synopsis of the type of content (e.g., a song, a speech, a book, etc.), the title, the topic, the personality associated with the content (e.g., disk jockey, talk show host, etc.), Internet location of the content, the broadcaster of the content, schedule information, genres, ratings, suggestions, affiliations, and details of the streaming protocols needed to access the content, including codec, bit-rate, playlist and reliability. The data is collected using automated software importing structured feeds and external sources, a web-based content management system for manual entry, and feedback and edits supplied by the moderated or un-moderated user community such as a Wiki. Web Services and Representation State Transfer (REST) interfaces accessible on the Internet, enable access to the Guide 300 data by Web applications also located on the Internet. Web applications may add and/or change user account and preference information, query categorical metadata such as genres, locations or user favorites, search and browse content via that metadata, obtain details about the content, begin streaming the content from the broadcaster source, and communicate problems with the content. Access to such Web Services requires authorization and authentication.

Computer Users 100 and Device Users 110 may select and navigate through Managed Content Streams 500 and Managed Ad Streams 600 through the use of physical interfaces such as mice, keyboards, buttons, joysticks, scroll wheels, remote controls, and touch screens, or computer generated interfaces such as buttons, pull down menus, tabs, ribbons, scroll bars, data grids, and other software user interface controls.

Computer Users 100 are computer users with authorized and authenticated access to the Internet and may access and playback audio, video, and multimedia streams (content and advertisements). Computer Users 100 include individuals with personal computers (PCs) with access to the Internet. Computer Users 100 may get access to information in the Guide 300 through a Web Browser or a standalone program. Access through a Web browser or a standalone program requires that that one or more Web applications exist on the Internet that is authorized, and authenticated to call to the Web Services published by the Guide 300. The Web Services are accessed by a Web application through an application programming interfaces (APIs). The APIs include—

Account_UserAuthenticate—Validates a given set of credentials against our identity management system;

Account_UserUpdateListenFilter—Modifies the allowable media types associated with a given user account;

Favorite_FolderGet—Retrieves all radio guide items associated with a container (folder) created and populated by a user;

Program_Get—Retrieves common metadata for a radio show, including title, host, language, and genres;

Station_Get—Retrieves common metadata for a radio station, including name, call sign, frequency, location, and genres;

Search_ByQuery—Finds all stations and programs matching a given text search term;

Search_ByCategory—Finds all stations and programs associated with a RadioTime-defined category, such as a genre or location;

Tuner_Tune—Identifies the highest quality, most reliable, most compatible listening source for a given radio station or program;

Recording_StatusUpdate—Provides a mechanism to report the success or failure in playing a stream delivered by the RadioTime guide; among others.

Web applications may be branded according to the developers of such applications enabling a plurality of independent Web sites to access and display data available in Guide 300. Furthermore, widgets that provide embeddable HTML content and applications using frameworks such as AJAX are available for other portals like Google Desktop, local news sites, and for social networking platforms such as Facebook, My Space, etc.

Additional functionality to that described herein is made available through integration with the social networking platforms. Integrated functionality includes in real-time and/or on a deferred basis 1) the ability to share with others to what a user is listening, viewing, and/or interacting; 2) the ability to set a reminder when a selected stream is available for listening, viewing, and/or interacting sent to a computer or handheld device through a separate program, a notification within the social networking site, an email, and/or an instant message; 3) the ability to share with others when a selected stream is available for listening, viewing, and/or interacting; 4) the ability to make and share commentary and rank selected streams available for listening, viewing, and/or interacting; and 5) the ability to record and share a selected streams;

Device Users 110 individuals with handheld devices such as cell phones, Smartphones, Personal Digital Assistants (PDAs), MP3 players, etc. or home entertainment devices such as the Logitech Squeezebox, Cisco Media products, Altec Lansing REX tuner, or other receivers, amplifiers, etc. that can access and play content located on the Internet 200 without the use of a general purpose computer. The Device Users 110 may get access to information in the Guide 300 through a Web Browser or a standalone program. Access through a handheld or consumer entertainment device requires that that one or more Web applications exist on the Internet that may be authorized, and authenticated to call to the Web Services published by the Guide 300. The Web Services are accessed by a Web application through an application programming interface (API) as described above. Web applications may be branded according to the device brand enabling a plurality of visually independent Web sites to access and display data available in Guide 300 based on the capabilities of the device.

When Computer Users 100 or Device Users 110 selects content to be delivered and played back, Content Guardian 501 in conjunction with Ad Guardian 601 creates a playlist of Content Streams 502 and Ad Stream Streams 602 to be delivered and played back on the Computer Users 100 or Device Users 110 machine. The playlist may be interpreted by the machine(s) associated with 1) the Computer Users 100 or Device Users 110, or 2) at the Guide 300 and/or Content Guardian 501 and/or Ad Guardian 601, or 3) at Computer Users 100 or Device Users 110 in coordination with Guide 300 and/or Content Guardian 501 and/or Ad Guardian 601. Guide 300 and/or Content Guardian 501 and/or Ad Guardian 601 may also be utilized as a payment gateway for ad revenue sharing to partners of Ad Guardian 601.

FIGS. 7A-7D describe the steps and interactions involved with authentication, access, and playback of Content Streams 502. Computer Users 100 or Device Users 110 locates content 1010 (in FIG. 7A) using data from the Guide 300 (in FIG. 1). Computer Users 100 or Device Users 110 selects content 1020. The selection of content may start a media player 1040 on the machine to receive a content stream selected by Computer Users 100 or Device Users 110. The selection is sent over the Internet 200 to the Guide 300 where user demographics are collected and stored 1050 in a database, directory service, or other large organized storage system. Demographics such as the age, sex, location, type of device, occupation, income range, date and time, type of content, past listening habits, consumer preferences, i.e., automobiles, restaurants, food, drink, etc. are collected automatically, by registration, and/or by directly querying the user.

The user selected content stream may be available from a plurality of content streams within Content Streams 502. In this case, the demographics about Computer Users 100 or Device Users 110 are used by Guide 300 to locate the most appropriate source for the selected content using knowledge of location of the user (from the demographics), information on the historical playback reliability of the selected content stream, the device, network connection, time and date, the user's favorites, speed and reliability of the options available, format of the available streams, and amount of time remaining in a shared broadcast. Additionally, the selection may be further influenced by commercial business relationships. For example, there may be multiple suppliers of a specific piece of content and user selection of content is directly related to the visibility of the content/supplier to the user. In this case, suppliers may be very interested in establishing a commercial relationship such that guide data is provided in a way that creates greater visibility for the content of the paying supplier to the user, resulting in more users for the paying supplier's content. In another example, the commercial business relationship with the Content Guardian 501 (independent of the Ad Guardian 601) and/or with an external entity, such as a performing artist (independent of the Ad Guardian 601 or the Content Guardian 501) could define for a fee, automatic selection of a specific content stream if certain playback criteria are met. If the user selected content stream is only available as a single content stream within Content Streams 502, this unique content stream will represent the content from the most appropriate location 1060.

The selected stream is sent to Content Guardian 501 and Ad Guardian 601 where authorized access 1070 to Content Streams 502 and Ad Streams 602 is respectively requested. Content Guardian 501 and Ad Guardian 601 may be different services of a single Guardian solution or may be completely independent Guardian services. Upon authorization, Ad Guardian 601 will select ads based on the access control rules and the stored demographics of Computer Users 100 or Device Users 110. Content Guardian 501 then creates for Computer Users 100 or Device Users 110 a playlist of content from (Content Streams 502) and targeted ads (from Ad Streams 602) 1080 where the ads may be placed before, during, and after user selected content.

Following or during the creation of the playlist, if a media player has not been started, a media player is started 1090 on the playback machine specified by Computer Users 100 or Device Users 110 with the playlist optionally sent to the playback machine. This is followed by the streaming 1100 of Content Streams 502 and Ad Streams 602 initiated by 1) the machine specified by Computer Users 100 or Device Users 110, or 2) the Content Guardian 501 and/Ad Guardian 601, or 3) is coordinated between Computer Users 100 or Device Users 110 and Content Guardian 501 and/Ad Guardian 601 to a player located on the machine specified by Computer Users 100 or Device Users 110 for interactive playback. During the playback, player interaction 1110 is monitored for user input.

Figure 7A:
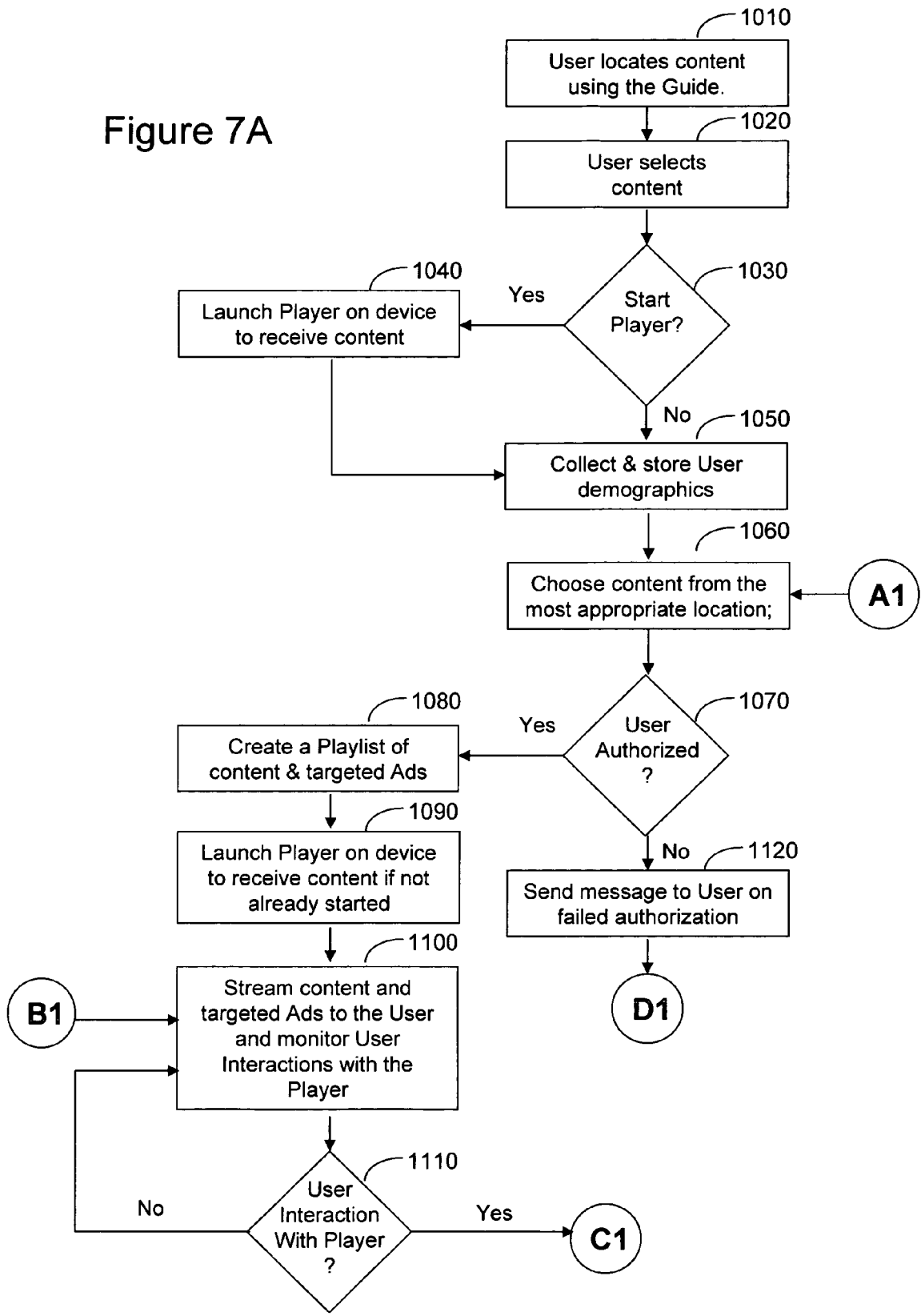
FIG. 7A outlines the steps of the process associated with users 100, 110 selection of Content Streams 502 and Ad Streams 602 using data from Guide 300. This figure is associated with the system shown in FIG. 1.
Figure 7B:
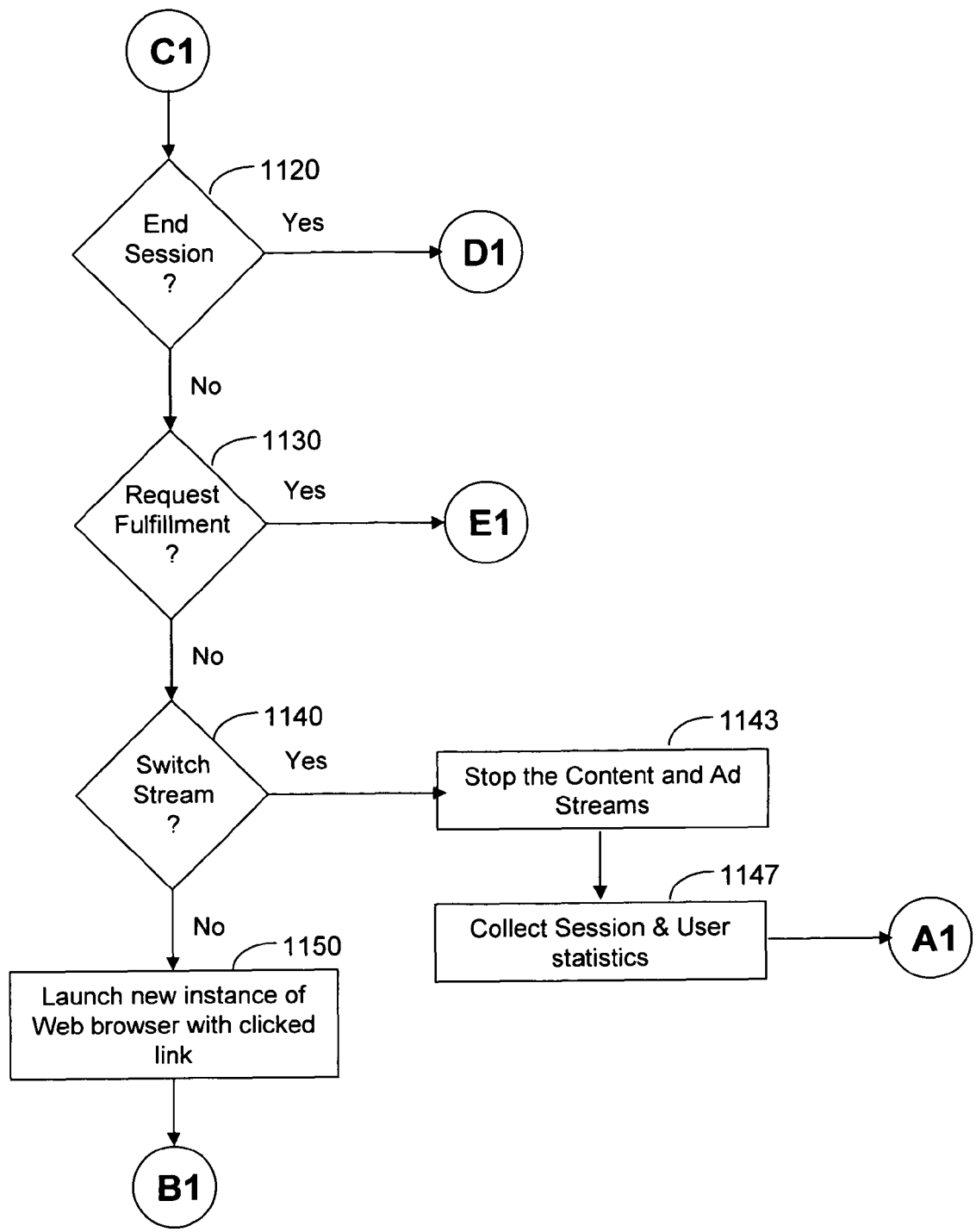
FIG. 7B is a continuation of the steps outlined in FIG. 7A. More specifically, it outlines the steps of the decision tree associated with users 100, 110 interactions with a content player. This figure is associated with the system shown in FIG. 1.
Figure 7C:
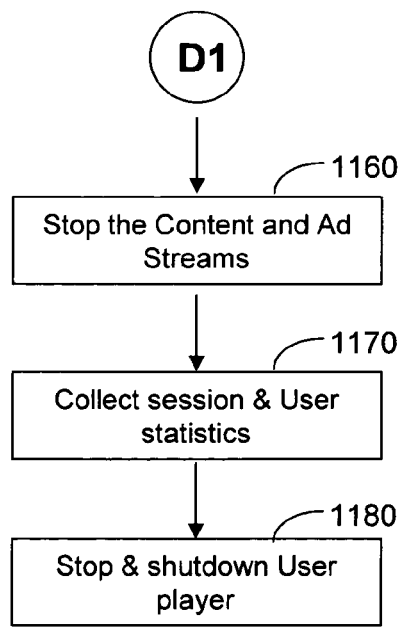
FIG. 7C is a continuation of the steps outlined in FIG. 7B. More specially, it outlines the steps associated with the user 100, 110 interactions for ending a streaming session. This figure is associated with the system shown in FIG. 1.

FIG. 7B characterizes the decision tree associated with a user interaction with the player 1110. User interactions result from a number of conditions. First, Computer Users 100 or Device Users 110 may be requesting to end the session 1120. This request leads to FIG. 7C, where the Content Streams 502 and Ad Streams 602 are stopped 1160 stream and session information, use and user statistics are collected 1170, and the player for Computer Users 100 or Device Users 110 is stopped and shutdown 1180.

Figure 7D:
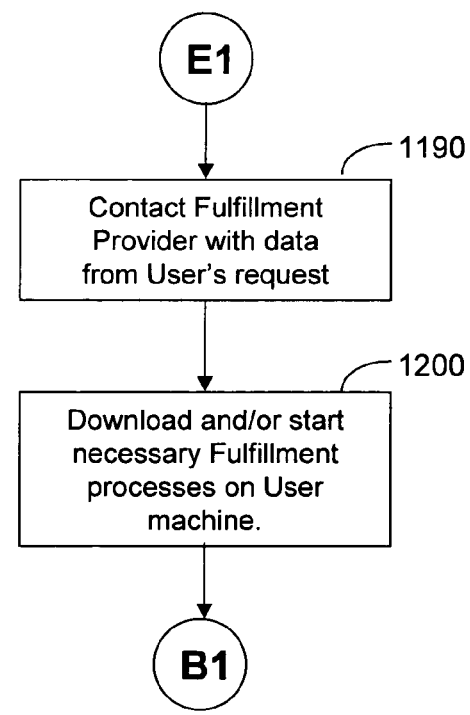
FIG. 7D is a continuation of the steps outlined in FIG. 7B. More specially, it outlines the steps associated with the user 100, 110 interactions for obtaining fulfillment of goods and services as presented within a player. This figure is associated with the system shown in FIG. 1.
Figure 8A:
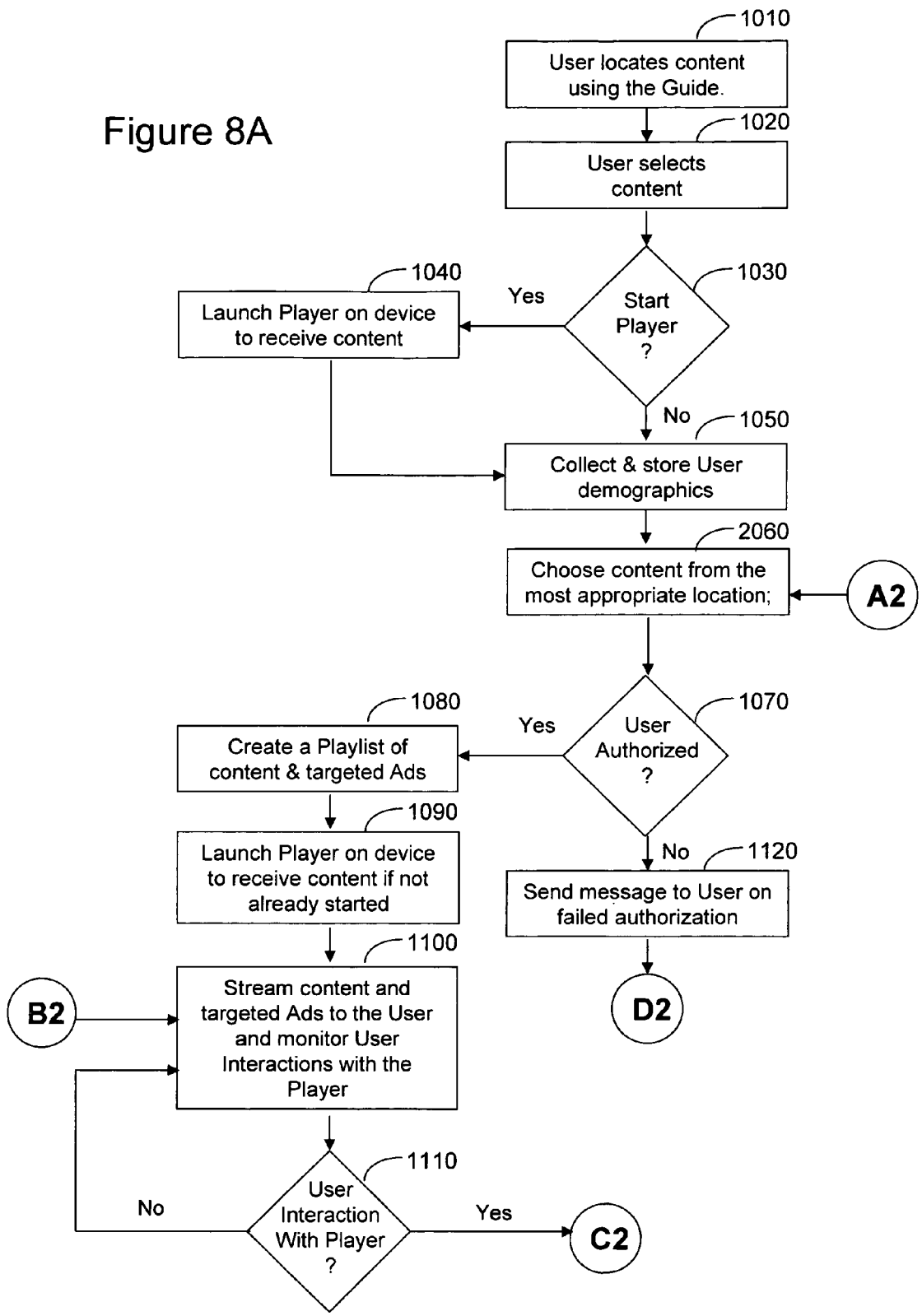
FIG. 8A outlines the steps of the process associated with users 100, 110 selections from a plurality of Content Streams 512, 522, 532 and Ad Streams 602 using data from Guide 300. This figure is associated with the system shown in FIG. 2.
Figure 8B:
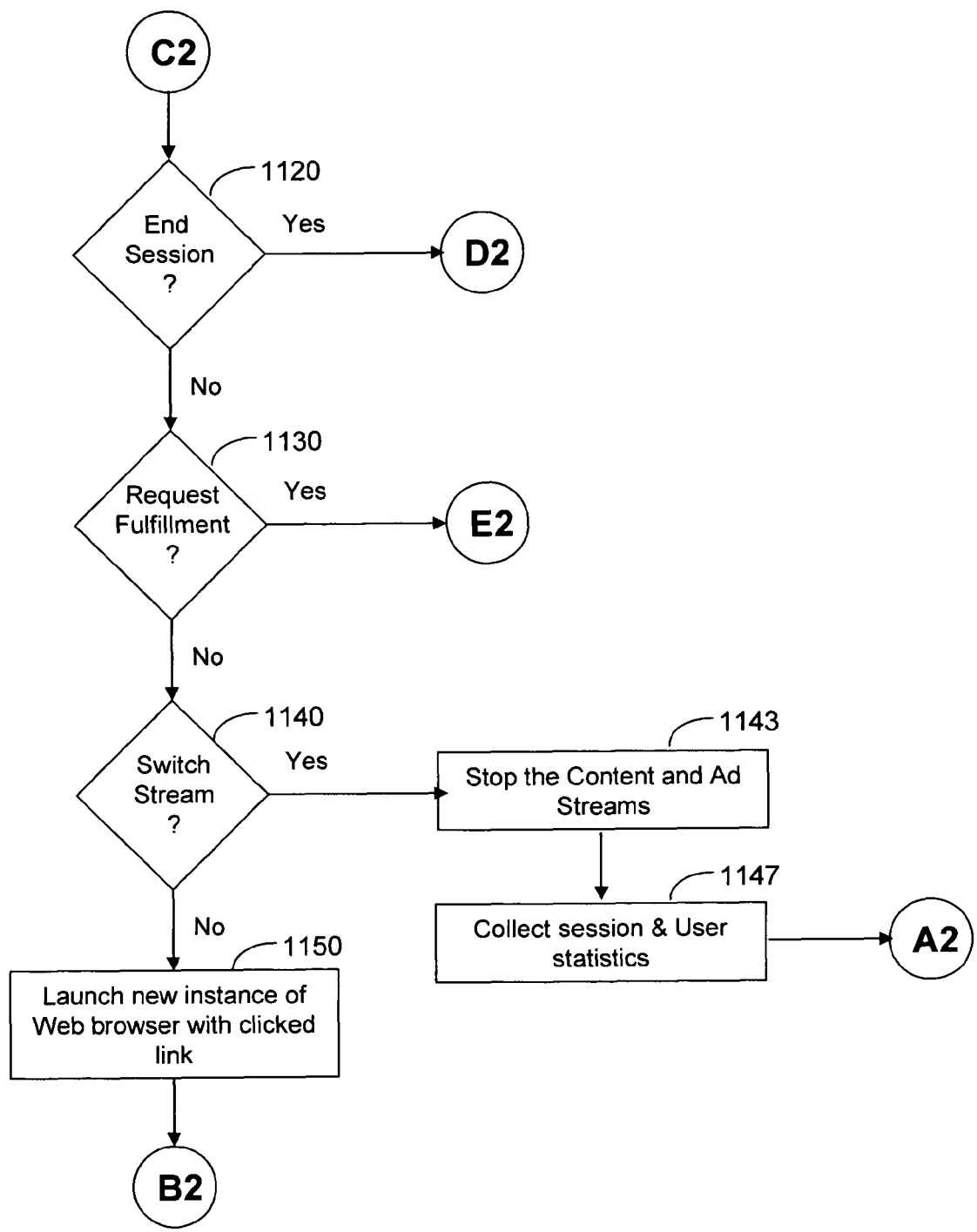
FIG. 8B is a continuation of the steps outlined in FIG. 8A. More specifically, it outlines the steps of the decision tree associated with users 100, 110 interactions with a content player. This figure is associated with the system shown in FIG. 2.
Figure 8C:
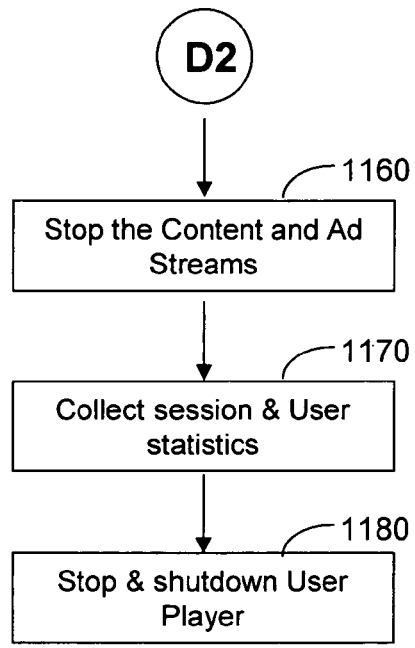
FIG. 8C is a continuation of the steps outlined in FIG. 8B. More specially, it outlines the steps associated with the user 100, 110 interactions for ending a streaming session. This figure is associated with the system shown in FIG. 2.
Figure 8D:
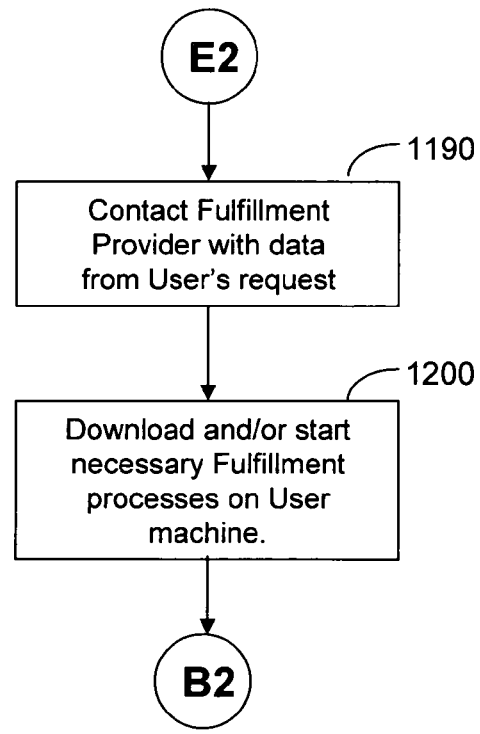
FIG. 8D is a continuation of the steps outlined in FIG. 8B. More specially, it outlines the steps associated with the user 100, 110 interactions for obtaining fulfillment of goods and services as presented within a player. This figure is associated with the system shown in FIG. 2.

A second reason for Player Interaction 1110 is that Computer Users 100 or Device Users 110 has fulfillment requests 1130 leading to steps shown in FIG. 7D. Here the information associated with Users 100 or Device Users 110 is passed to the Fulfillment Provider 1190 over the Internet, by WiFi, cellular network, DSL, cable, dial-up, etc. In order to fulfill the user's request, it may be necessary to download information for display and/or to run a program on a machine specified by or automatically selected for Computer Users 100 or Device Users 110 in order to fulfill the request 1200. For example, if a user "clicks" on a buy button for a song, the information such as the album, artist, name of song, album cover art, length of song, genre, price, release year, composer, etc. could be presented to the user through the player or through a different application.

A third reason for Player Interaction 1110 (continuing on FIG. 7B) may be that Computer Users 100 or Device Users 110 has requested a switch to a different stream 1140. In this case, Content Streams 502 and Ad Streams 602 are stopped 1143 and stream and stream use information and use as well user statistics collected 1147. Following this, the process that began the creation of the playlists of content and targeted ads 1060 is restarted.

The fourth and final reason for Player Interaction 1110 (continuing on FIG. 7B) may be that Computer Users 100 or Device Users 110 has "clicked" a link within the player 1150 requesting the launch of a specific Web destination within a browser. Following this player interaction, the process playback of content and targeted ads as well as the monitoring for player interaction 1100 is continued.

Figure 2:
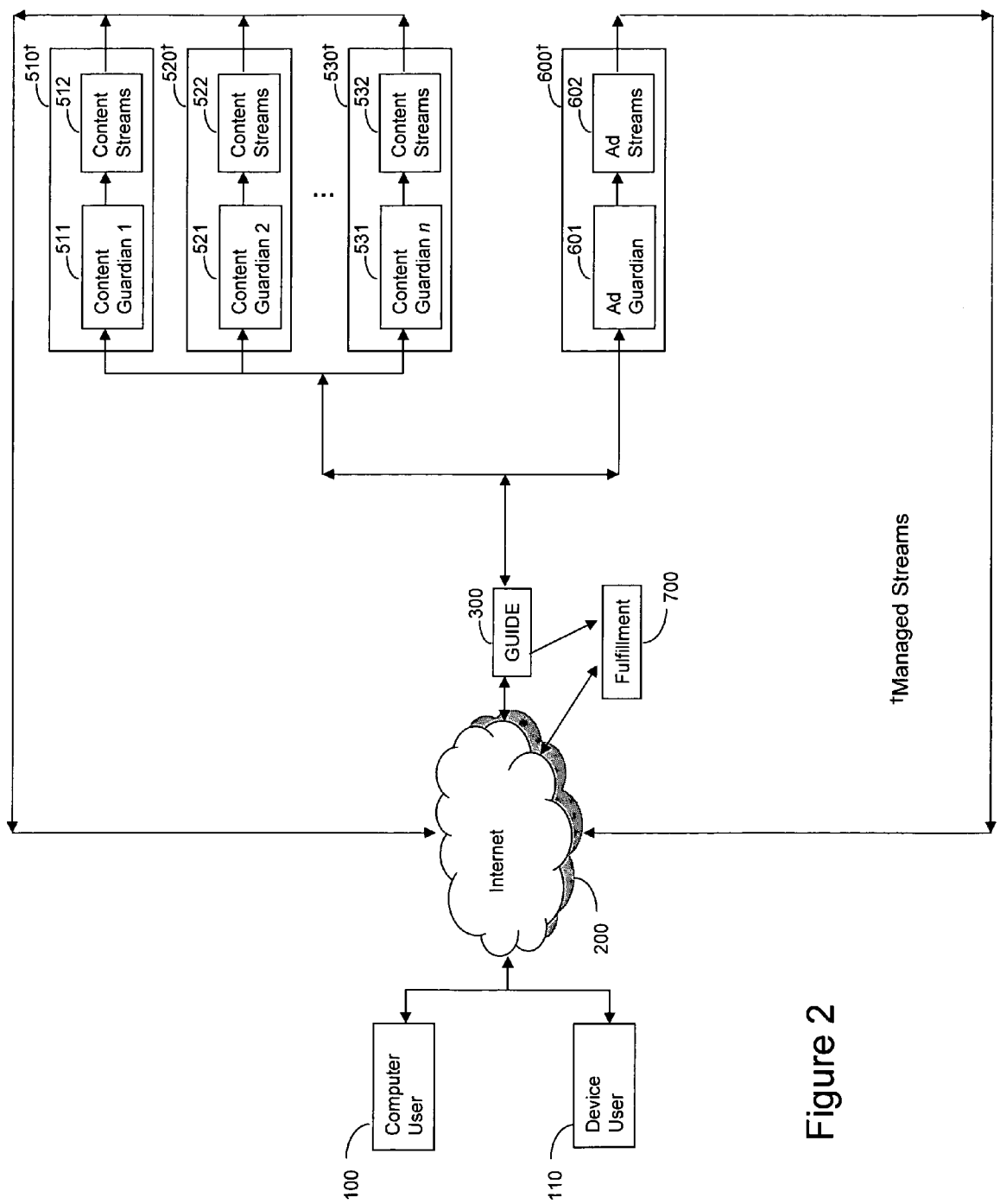
FIG. 2 is a diagram the system having users 100, 110, the Internet 200, the Guide 300, a plurality of Managed Content 510, 520, 530 each with a single Content Guardian 511, 521, 531 respectively and Content Streams 512, 522, 532 respectively (each made up of a plurality of content streams), Managed Ads 600 with a single Ad Guardian 601 and a single Ad Streams 602 (made up of a plurality of Ad streams), and Fulfillment 700.

FIG. 2 illustrates an alternative embodiment of the system. The characteristics of the individual components are mostly identical to those described in FIG. 1, except as shown by a plurality of Managed Streams 510, 520, 530 each of which has associated a Content Guardian 511, 521, 531 respectively and Content Streams 512, 522, 532 respectively.

FIGS. 8A-8D describe the steps and interactions involved with access and playback of Content Streams 512, 522, 532 as illustrated in FIG. 2. The characteristics of the individual steps are nearly identical to those described in FIGS. 7A-7D with the exception of step 2060. In this case, the user selected content may come from a plurality of Managed Streams 510, 520, 530. Computer Users 100 or Device Users 110 demographics are used by Guide 300 to select the most appropriate source across different authentication and access points Control Guardian 511, 521, 531 for Content Streams 512, 522, 532. Content selection is based on knowledge of the location of the user (from the demographics) as well as information on the historical playback reliability of the selected content stream to in order to choose the content from the most appropriate location 2060. Additionally, the selection may be further refined by commercial business relationships as defined in step 1060. If the user selected content stream is only available as a single content stream within Content Streams 512, 522, 532, this unique content stream will represent the content from the most appropriate location 2060.

Figure 3:
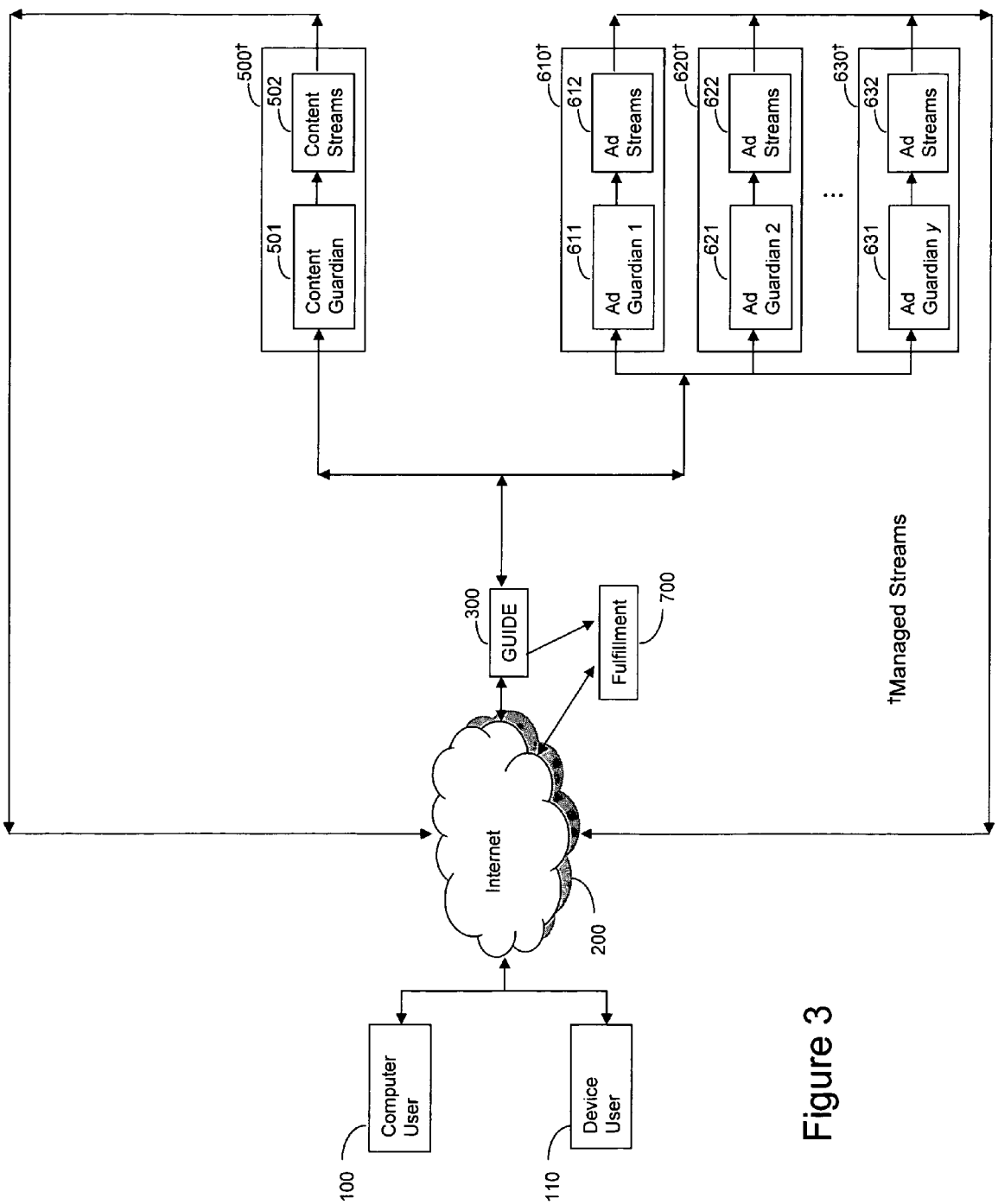
FIG. 3 is a diagram the system having users 100, 110, the Internet 200, the Guide 300, Managed Content 500 each with a single Content Guardian 501 and Content Streams 502 (made up of a plurality of content streams), a plurality of Managed Ads 610, 620, 630 each with a single Ad Guardian 611, 621, 631 respectively and Ad Streams 612, 622, 632 respectively (each made up of a plurality of Ad streams), and Fulfillment 700.

FIG. 3 further illustrates another embodiment of the system. The characteristics of the individual components are nearly identical to those described in FIG. 1 except as shown, a plurality of Managed Ad Streams 610, 620, 630 each of which has associated an Ad Guardian 611, 621, 631 respectively and Ad Streams 612, 622, 632 respectively.

Figure 9B:
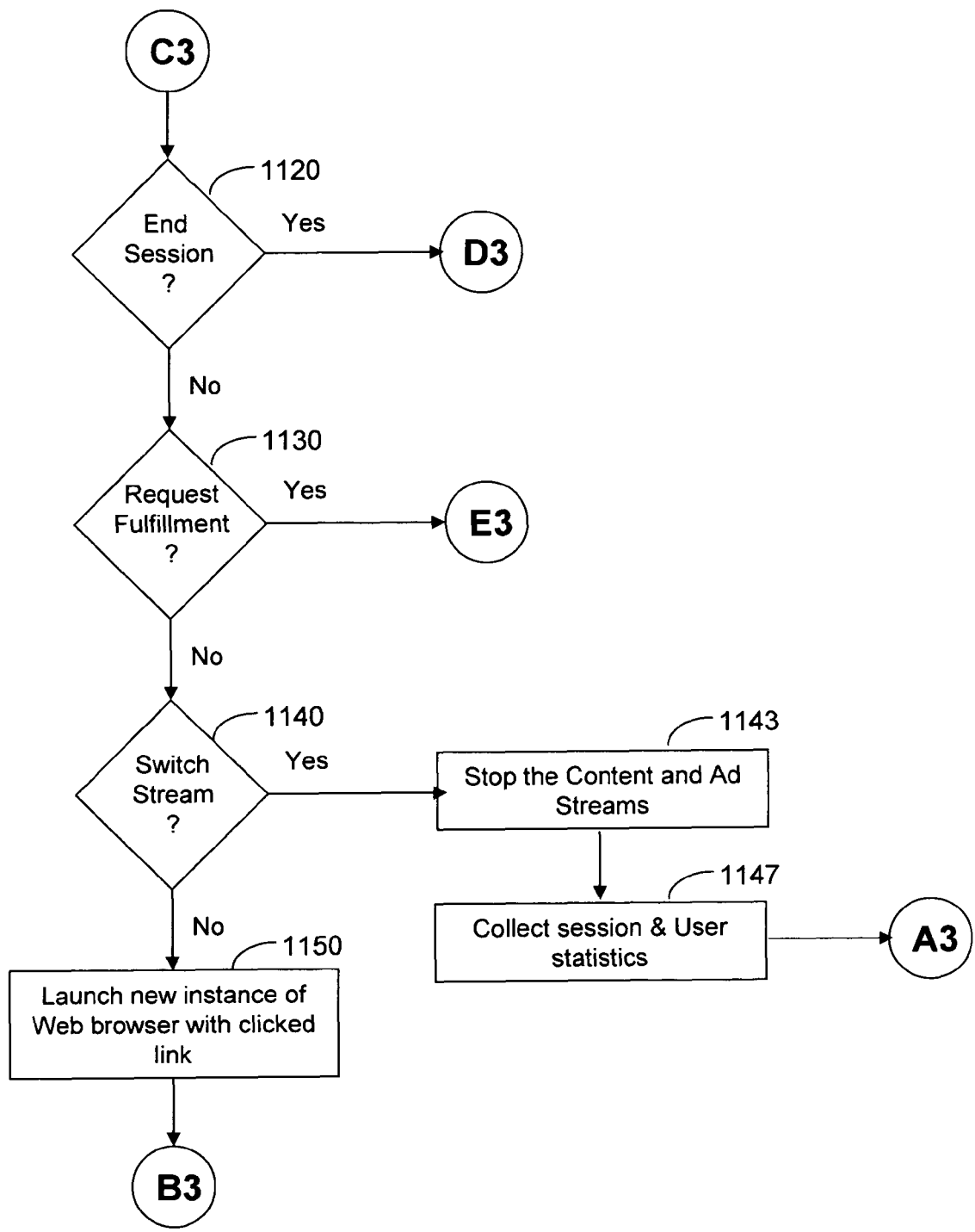
FIG. 9B is a continuation of the steps outlined in FIG. 9A. More specifically, it outlines the steps of the decision tree associated with users 100, 110 interactions with a content player. This figure is associated with the system shown in FIG. 3.
Figure 9C:
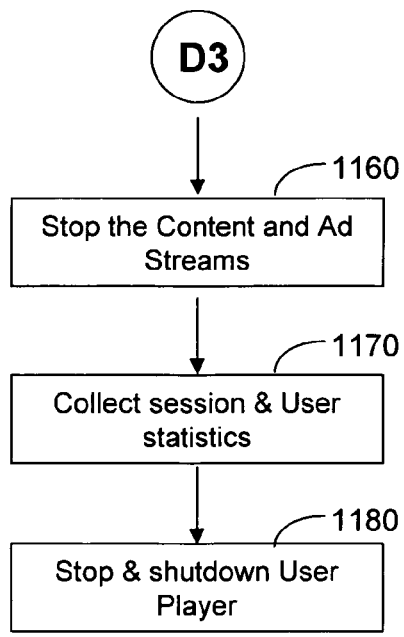
FIG. 9C is a continuation of the steps outlined in FIG. 9B. More specially, it outlines the steps associated with the user 100, 110 interactions for ending a streaming session. This figure is associated with the system shown in FIG. 3.
Figure 9D:
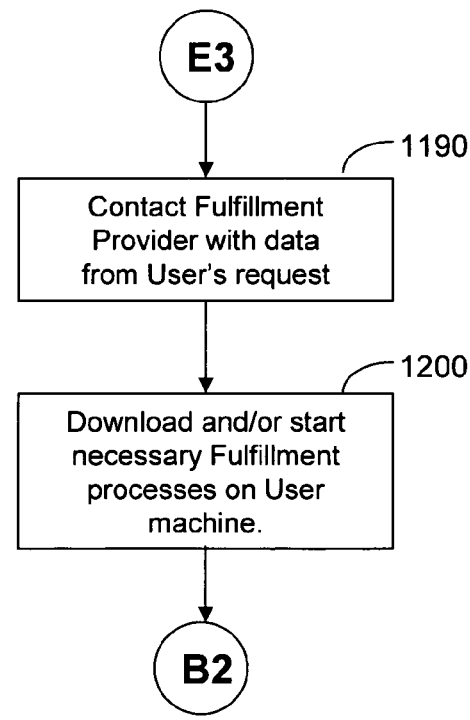
FIG. 9D is a continuation of the steps outlined in FIG. 9B. More specially, it outlines the steps associated with the user 100, 110 interactions for obtaining fulfillment of goods and services as presented within a player. This figure is associated with the system shown in FIG. 3.

FIGS. 9A-9D describe the steps and interactions involved with access and playback of a user selected content stream within Content Stream 502 with a plurality of Managed Ad Streams 610, 620, 630 as illustrated in FIG. 3. Steps in FIG. 9A are nearly identical to those described in FIG. 7A with the exception of steps 3070 and 3080. In this embodiment following step 1060 (in FIG. 9A), Guide 300 sends the selected stream to Content Guardian 501 for User Authorization 3070. Included in this step is 1) Authorization from a specific Ad Guardian 611, 621, 631 with whom an existing commercial relationship exists between a specific Content Guardian 501 for ad streams associated with the user selected content; or 2) Selecting from multiple Ad Guardians 611, 621, 631 (with whom an existing commercial relationships exists between the specific Content Guardian 501 for ad streams associated with the user selected content), the ads which generates the largest amount of advertising revenue and getting authorization from different specific Ad Guardians 611, 621, 631; or 3) Default authorization because the content stream is marked for null advertisements (as would be the case for a user based content subscription service).

Following Authorization 3070, Content Guardian 501 in conjunction with Ad Guardian 611, 621 or 631 creates a playlist of content from Content Streams 502 and targeted ads 3080 where the (or the lack of) ads is defined by the User Authorization 3070.

Figure 4:
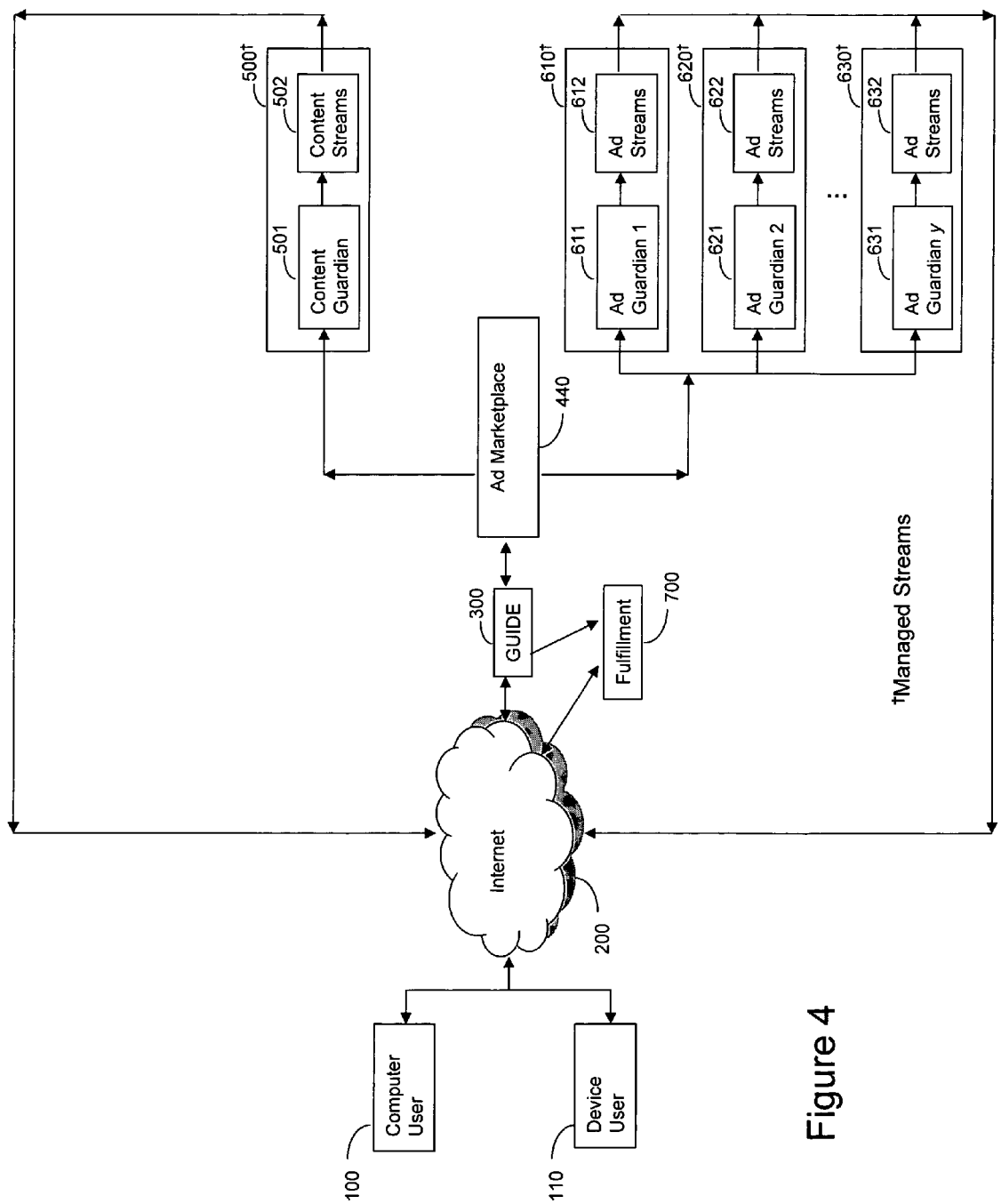
FIG. 4 is a diagram the system having users 100, 110, the Internet 200, the Guide 300, Ad Marketplace 440, Managed Content 500 each with a single Content Guardian 501 and Content Streams 502 (made up of a plurality of content streams), a plurality of Managed Ads 610, 620, 630 each with a single Ad Guardian 611, 621, 631 respectively and Ad Streams 612, 622, 632 respectively (each made up of a plurality of Ad streams), and Fulfillment 700.

FIG. 4 illustrates yet another embodiment of the system. The characteristics of the individual components are nearly identical to those described in FIG. 3 except as shown, Ad Marketplace 440. In this embodiment, the system includes a marketplace in which Content Guardian 501 requests a specific monetary sum (i.e., ask price) for placing ads on a content stream within Content Streams 502 and can accept a monetary sum (i.e., bid price) to place an ad from Ad Guardians 611, 621, or 631 before, during, and after a user selected stream from Content Streams 502.

Figure 10A:
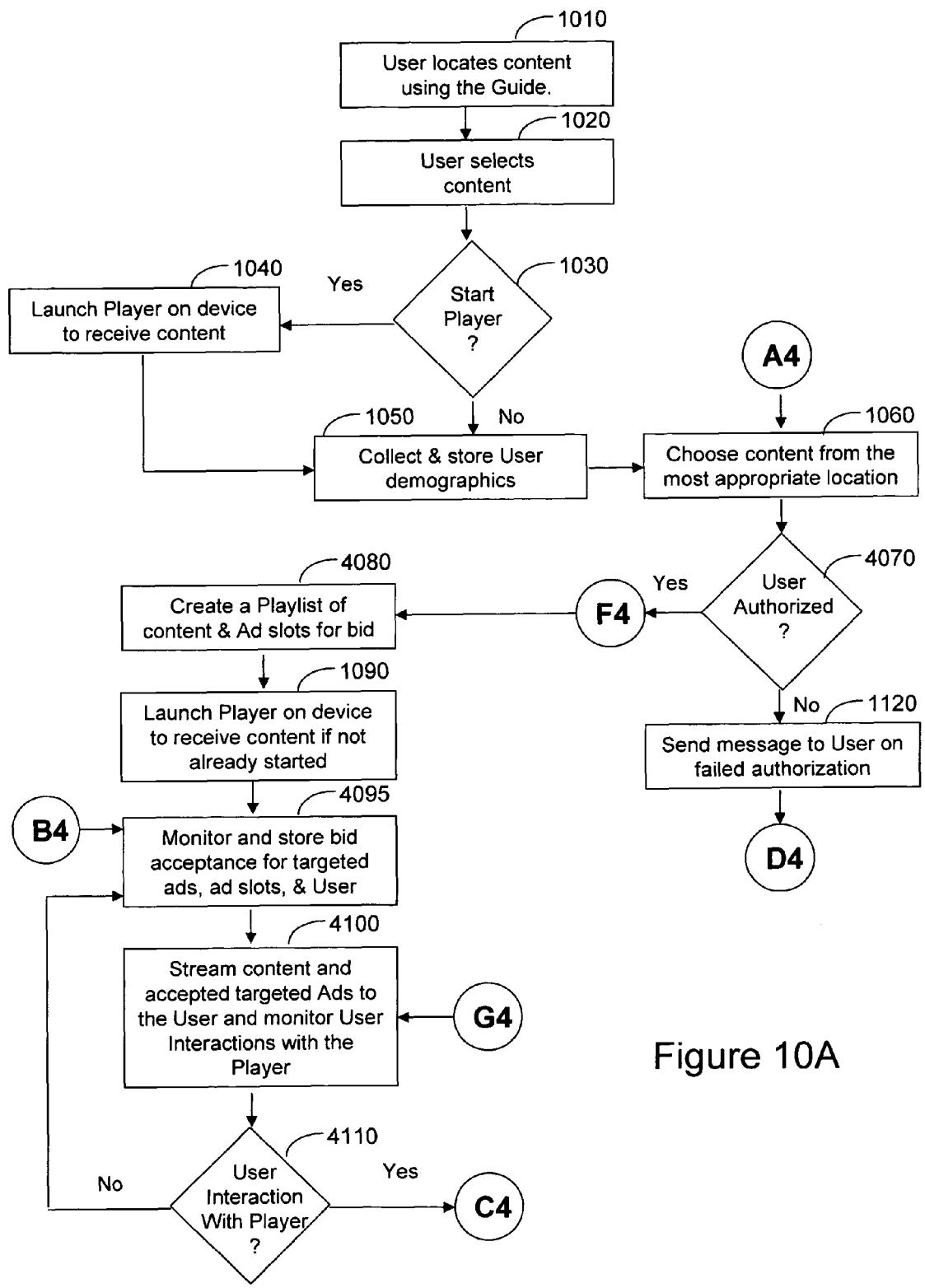
FIG. 10A outlines the steps of the process associated with users 100, 110 selections from a plurality of Content Streams 502 and Ad Streams 612, 622, 632 using data from Guide 300 and Ad Marketplace 440. This figure is associated with the system shown in FIG. 4.

FIGS. 10A-10E describe the steps and interactions involved with Ad Marketplace 440, access and playback of a user selected content stream within Content Stream 502 with a plurality of Managed Ad Streams 610, 620, 630 as illustrated in FIG. 4. Steps in FIG. 10A are close to those described in FIG. 7A with the exception of a number steps following 1060 (in FIG. 10A). In this embodiment the steps following 1060 (in FIG. 10A) and continues in FIG. 10E. Here Ad Marketplace 440 requests authorized access 4070 to Content Streams 502 from Content Guardian 501, authorized access to Ad Streams 602 from Ad Guardian 601, and gathers detailed "ad slot information", i.e., the asking prices for open ad slots before, during, and after the user selected content stream, the time in which a bid must be received, the metadata for the stream, and user demographics. Following this, Ad Marketplace 440 sends to the Ad Guardians 611, 621, 631 the detailed ad slot information 4500 (in FIG. 10E) the start of defining market prices for ad slots in content streams.

Figure 10B:
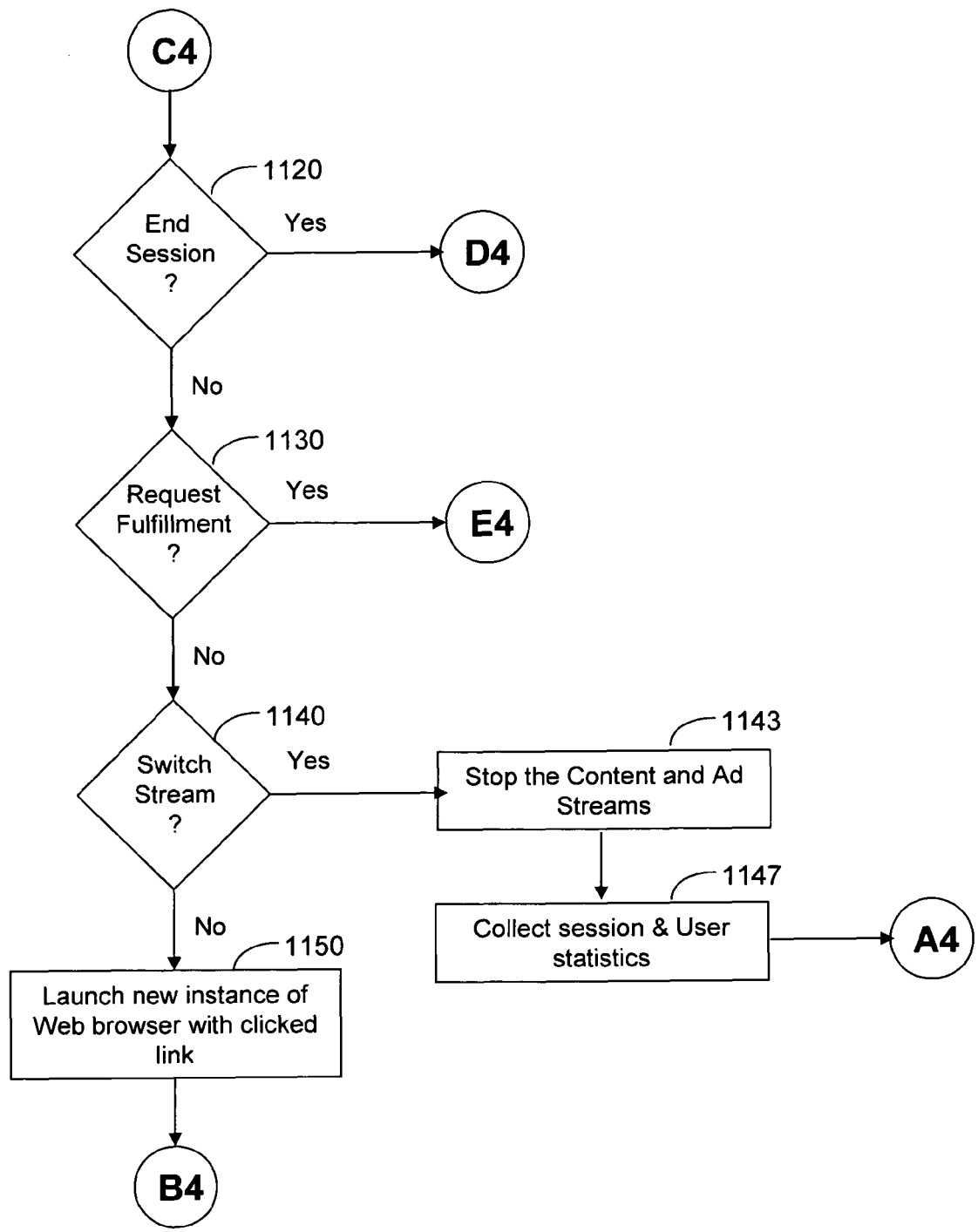
FIG. 10B is a continuation of the steps outlined in FIG. 10A. More specifically, it outlines the steps of the decision tree associated with users 100, 110 interactions with a content player. This figure is associated with the system shown in FIG. 4.
Figure 10C:
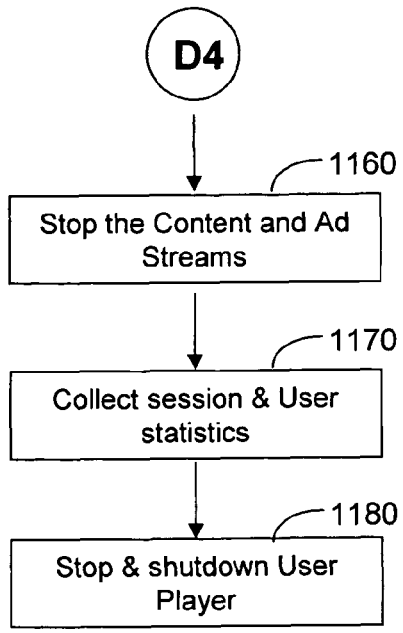
FIG. 10C is a continuation of the steps outlined in FIG. 10B. More specially, it outlines the steps associated with the user 100, 110 interactions for ending a streaming session. This figure is associated with the system shown in FIG. 4.
Figure 10D:
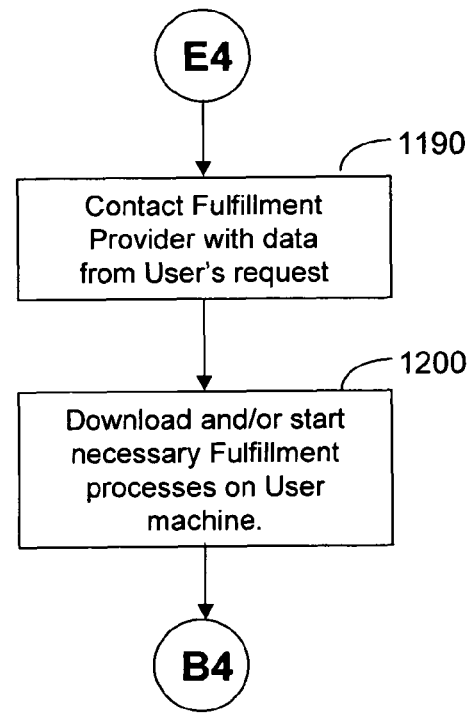
FIG. 10D is a continuation of the steps outlined in FIG. 10B. More specially, it outlines the steps associated with the user 100, 110 interactions for obtaining fulfillment of goods and services as presented within a player. This figure is associated with the system shown in FIG. 4.

At this point, the Ad Marketplace 440 monitors for bids and continues with the process of preparing for streaming the user selected content 4510 (referring back to FIG. 10A). Here, a playlist of the user selected content and ad slots is created 4080. Next, a content player is launched on the user device if it has not already started 1090. This is followed by continuous monitoring and storing information (i.e., the location of the targeted ad, the ad slot, and the user) 4095 about accepted bids from Content Guardian 501. This is followed by the streaming 4100 of Content Streams 502 and ad streams with accepted bids initiated by 1) the machine specified by Computer Users 100 or Device Users 110, or 2) the Content Guardian 501 and/Ad Guardian 611, 621, 631, or 3) is coordinated between Computer Users 100 or Device Users 110 and Content Guardian 501 and/Ad Guardian 611, 621, 631 to a player located on the machine specified by Computer Users 100 or Device Users 110 for interactive playback. During the playback, player interaction 4110 is monitored for user input. If there is no input, step 4095 is continued. Steps in FIG. 10B are nearly identical to those described in FIG. 7B with the exception of the step following 1150 (launching of a new instance of a browser with a link clicked by a user) which continues with step 4095 (in FIG. 10A). Similarly, steps in FIG. 10D are nearly identical to those described in FIG. 7D with the exception of the step following (downloading and/or starting the necessary Fulfillment processes on the user machine) step 1200, which continues with step 4095 (in FIG. 10A). Step 4095 performs monitoring and stores information (i.e., the location of the targeted ad, the ad slot, and the user) associated with accepted bids.

Continuing with the process of finding a market price for ad spots (in FIG. 10E), Ad Marketplace 440 checks for bids 4520. For each bid 4520, Ad Marketplace 440 checks with Content Guardian 501 if the bid is for the last ad slot 4550. If the bid is not for the last ad spot, Ad Marketplace 440 checks with Content Guardian 501 whether the bid is acceptable 4560. For an acceptable bid, the accepted price and ad specific ad stream slot is noted 4530 and used in step 4095 (in FIG. 10A) for playback to the user and continued monitoring for bids 4510. If bid is not acceptable, the Ad Marketplace 440 continues monitoring for bids 4510. If the bid is for the last ad spot Ad Marketplace 440 checks with Content Guardian 501 whether the bid is acceptable 4570. For an acceptable bid for the last ad slot, the accepted price and ad specific ad stream slot is noted 4590 and used in step 4095 (in FIG. 10A) for playback to the user and then terminate the process for setting market prices for the specific content stream and user 4600. For an unacceptable bid for the last ad slot, Ad Marketplace 440 checks to see if the bid closing time has been reached 4580. If the bid closing time has been reached for the last ad slot, terminate the process for setting market prices for the specific content stream and user 4600. Otherwise, Ad Marketplace 440 continues monitoring for bids 4510.

Figure 10E:
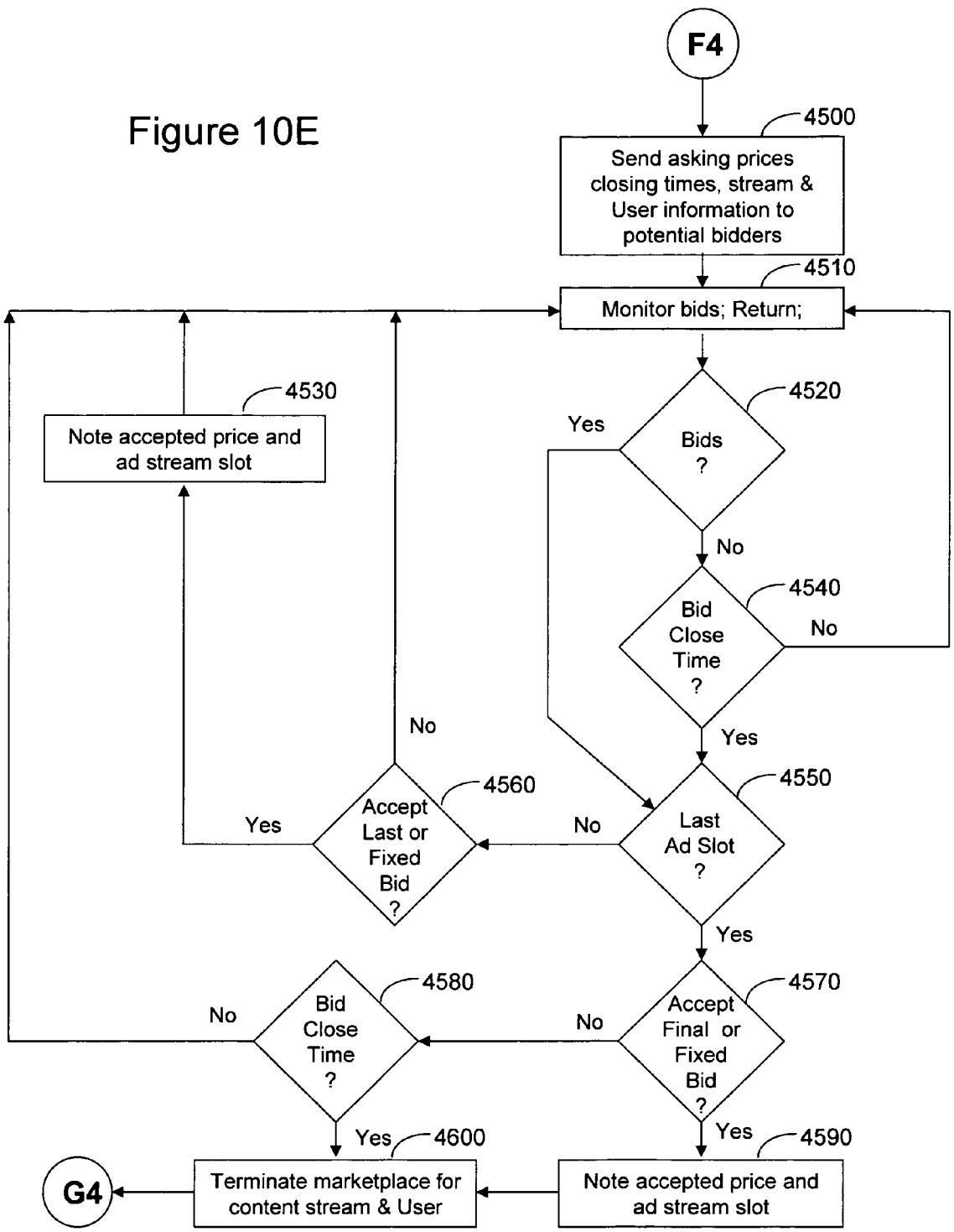
FIG. 10E is a continuation of the steps outlined in FIG. 10A. More specially, it outlines the steps associated with the playback of content streams with ads from multiple Ad Guardians 611, 621, 631 such that ad selection and placement determined through Ad Marketplace 440. This figure is associated with the system shown in FIG. 4.

Continuing with FIG. 10E and 4520, during the process of monitoring for bids, the bid close times are also monitored 4540. If a bid close time is not reached, the monitoring continues 4510. If a bid close time is reached 4540, Ad Marketplace 440 checks with Content Guardian 501 if the bid close time is for the last ad slot 4550. If the bid close time is not for the last ad spot 4550, Ad Marketplace 440 checks with Content Guardian 501 to see if the last bid is acceptable at that time. For an acceptable last bid, the accepted price and ad specific ad stream slot is noted 4530 and used in step 4095 (in FIG. 10A) for playback to the user and continued monitoring for bids 4510. If the last bid is not acceptable, the Ad Marketplace 440 continues monitoring for bids 4510. If the bid close time is for the last ad spot 4550, Ad Marketplace 440 checks with Content Guardian 501 to see if the last bid is acceptable at that time. For an acceptable last bid for the last bid close time, the accepted price and ad specific ad stream slot is noted 4590 and used in step 4095 (in FIG. 10A) for playback to the user and terminate the process for setting market prices for the specific content stream and user 4600. For an unacceptable last bid for the last bid time 4580, Ad Marketplace 440, terminates the process for setting market prices for the specific content stream and user 4600.

Figure 5:
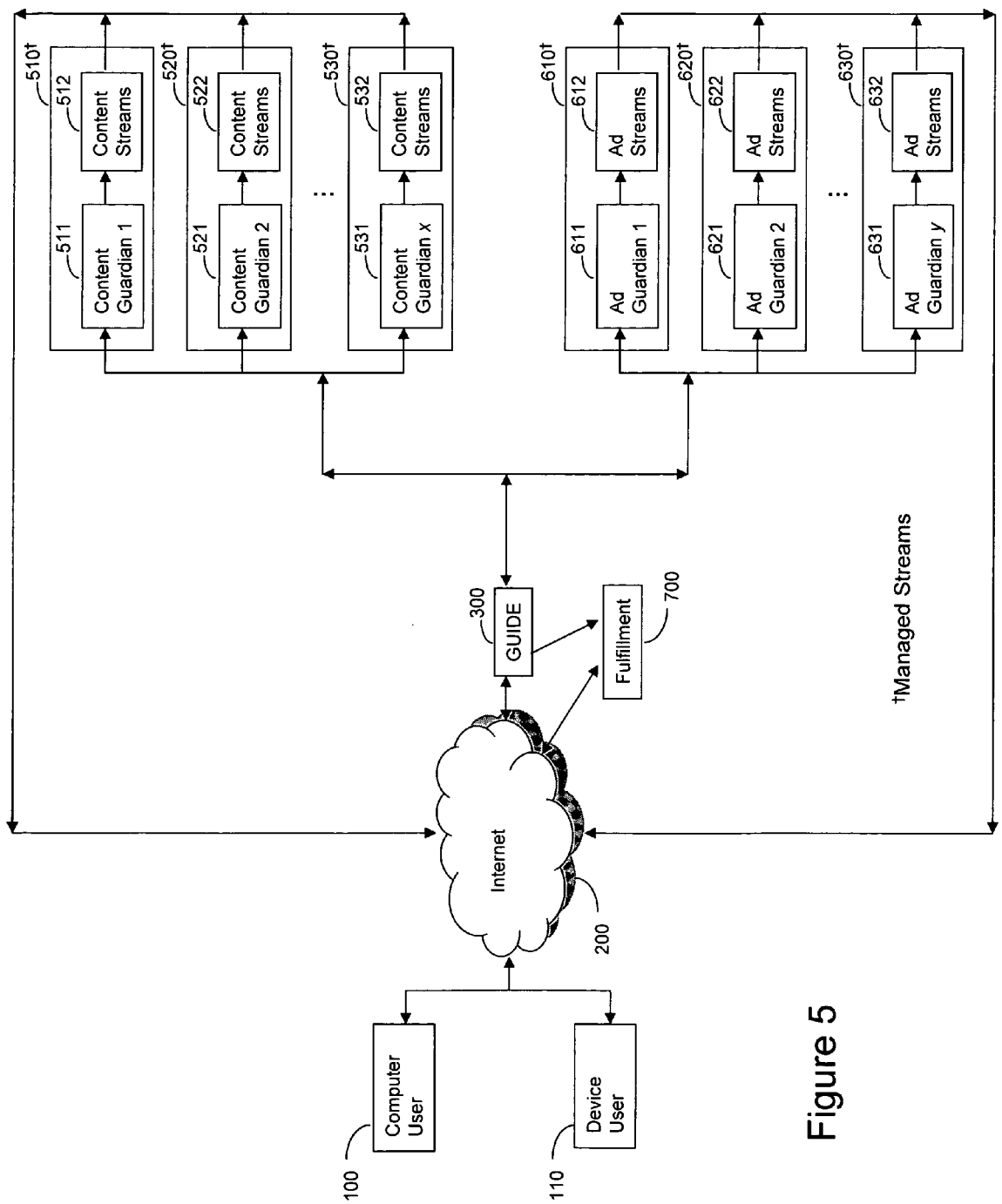
FIG. 5 is a diagram the system having users 100, 110, the Internet 200, the Guide 300, a plurality of Managed Content 510, 520, 530 each with a single Content Guardian 511, 521, 531 respectively and Content Streams 512, 522, 532 respectively (each made up of a plurality of content streams), a plurality of Managed Ads 610, 620, 630 each with a single Ad Guardians 611, 621, 631 respectively and Ad Streams 612, 622, 632 respectively (each made up of a plurality of Ad streams), and Fulfillment 700.

FIG. 5 illustrates another embodiment of the system. The characteristics of the individual components are nearly identical to those described in FIG. 3 except as shown, and a plurality of Managed Content Streams 510, 520, 530 each of which has associated a Content Guardian 511, 521, 531 respectively and Content Streams 512, 522, 532 respectively.

Figure 11A:
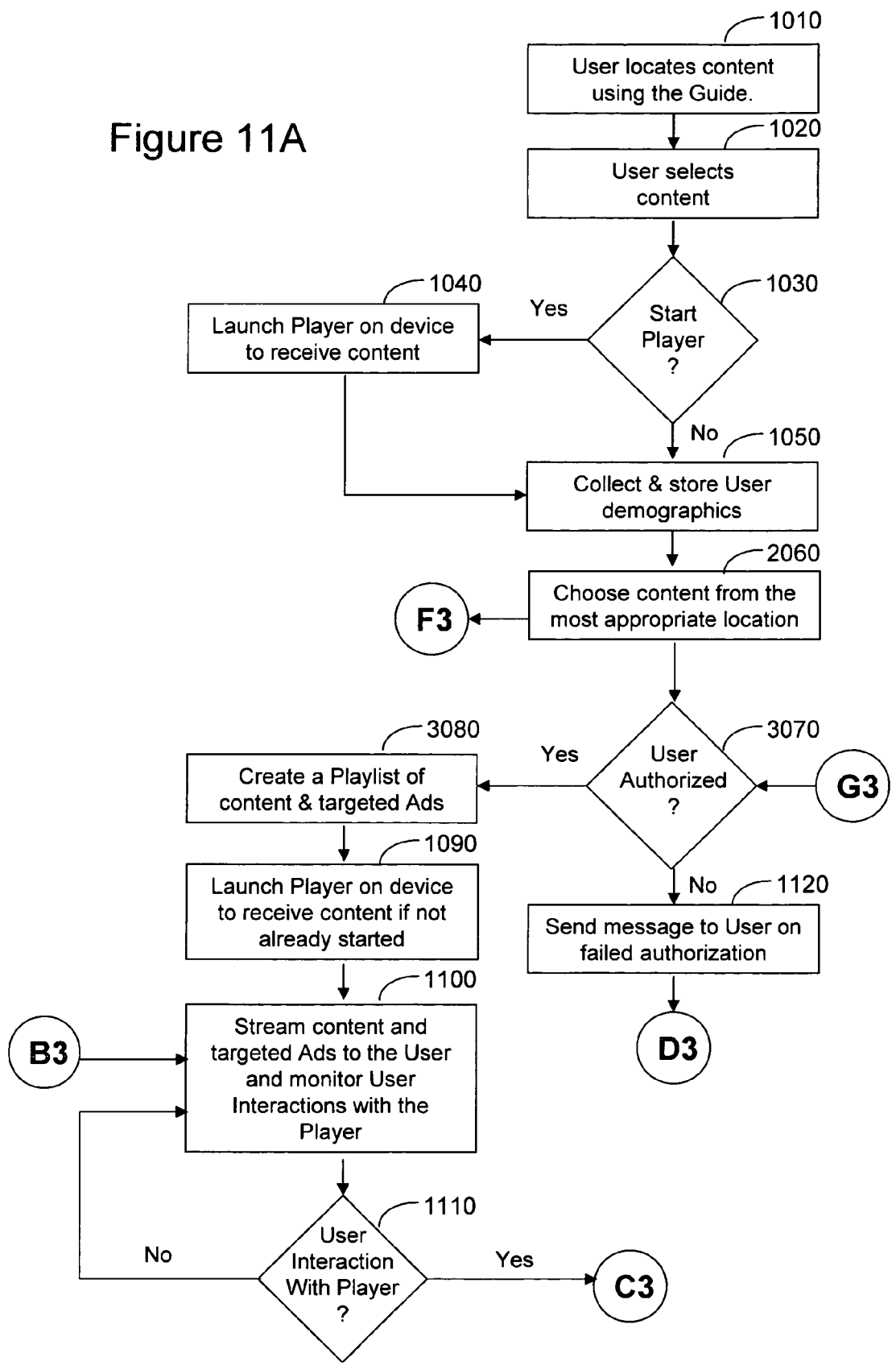
FIG. 11A outlines the steps of the process associated with users 100, 110 selections from a plurality of Content Streams 511, 522, 532 and a plurality of Ad Streams 612, 622, 632 using data from Guide 300. This figure is associated with the system shown in FIG. 5.
Figure 11B:
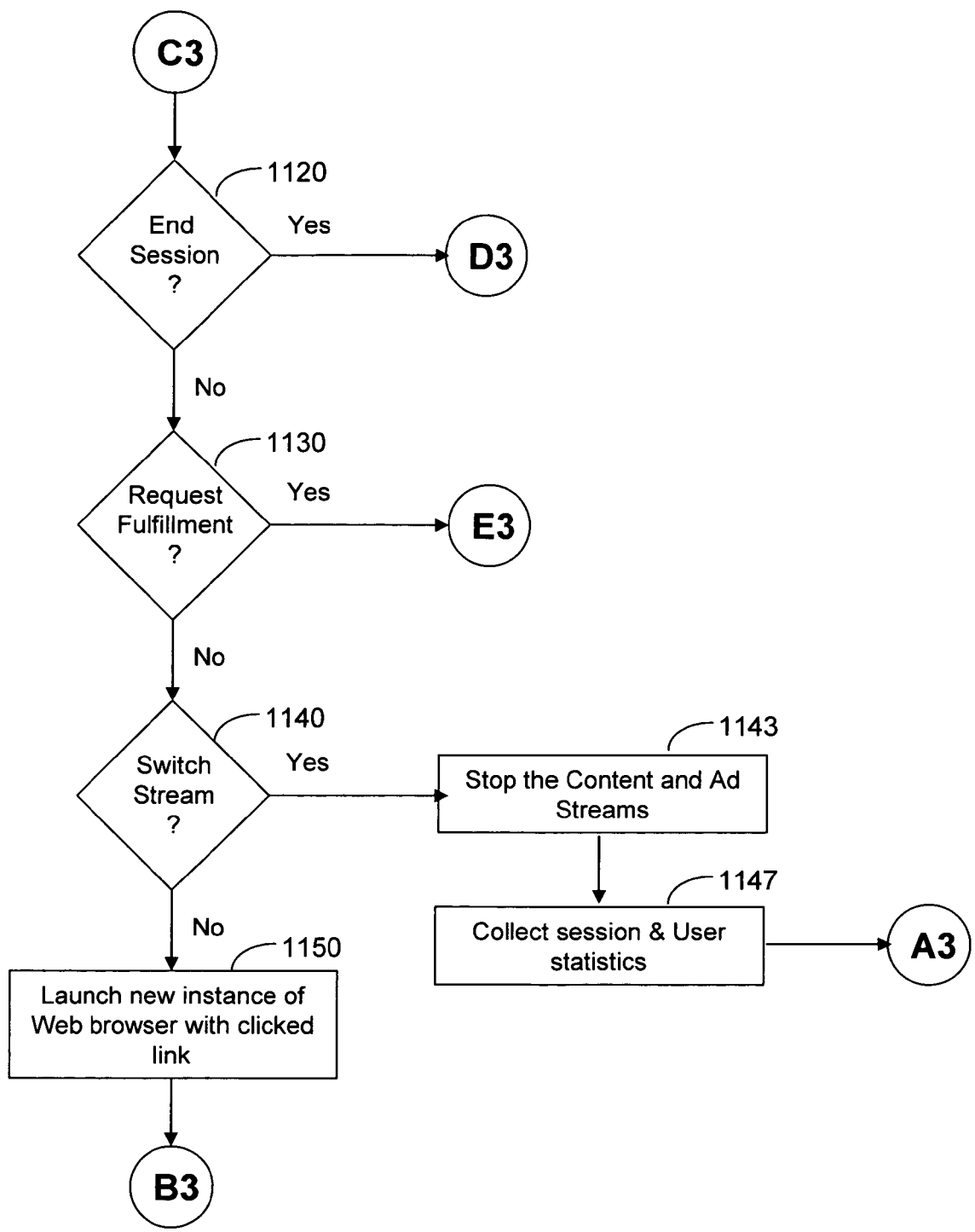
FIG. 11B is a continuation of the steps outlined in FIG. 11A. More specifically, it outlines the steps of the decision tree associated with users 100, 110 interactions with a content player. This figure is associated with the system shown in FIG. 5.
Figure 11C:
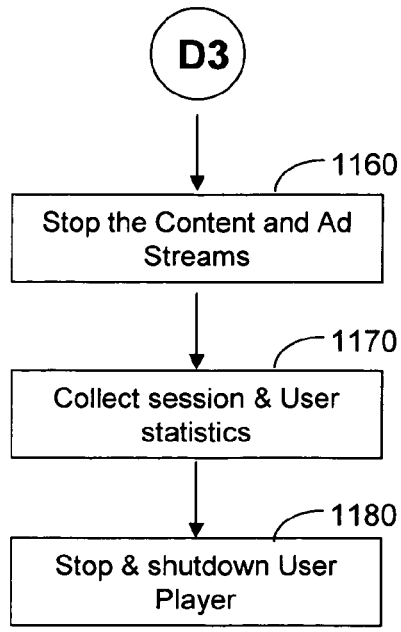
FIG. 11C is a continuation of the steps outlined in FIG. 11B. More specially, it outlines the steps associated with the user 100, 110 interactions for ending a streaming session. This figure is associated with the system shown in FIG. 5.
Figure 11D:
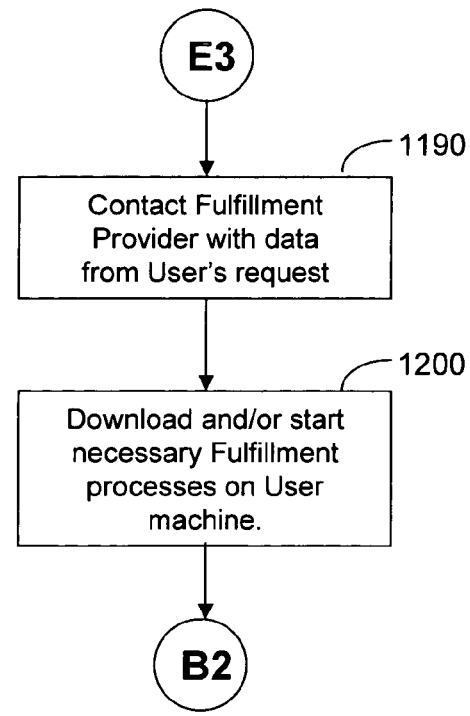
FIG. 11D is a continuation of the steps outlined in FIG. 11B. More specially, it outlines the steps associated with the user 100, 110 interactions for obtaining fulfillment of goods and services as presented within a player. This figure is associated with the system shown in FIG. 5.

FIGS. 11A-11D describe the steps and interactions involved with access and playback of a user selected content stream from a plurality of Managed Content Streams 510, 520, 530 and a plurality of Managed Ad Streams 610, 620, 630 as illustrated in FIG. 5. Steps in FIG. 11A are nearly identical to those described in FIG. 9A with the exception of steps 2060. Step 2060, however, is described in relation to the system illustrated in FIG. 5 and associated with the functional steps and interactions to create a playlist where there is a plurality of Content Streams 510, 520, 530. Therefore, the steps described in FIGS. 11A-11D are a combination of those associated with those in FIG. 2/FIGS. 8A-8D and those in FIG. 3/FIGS. 9A-9D.

Figure 6:
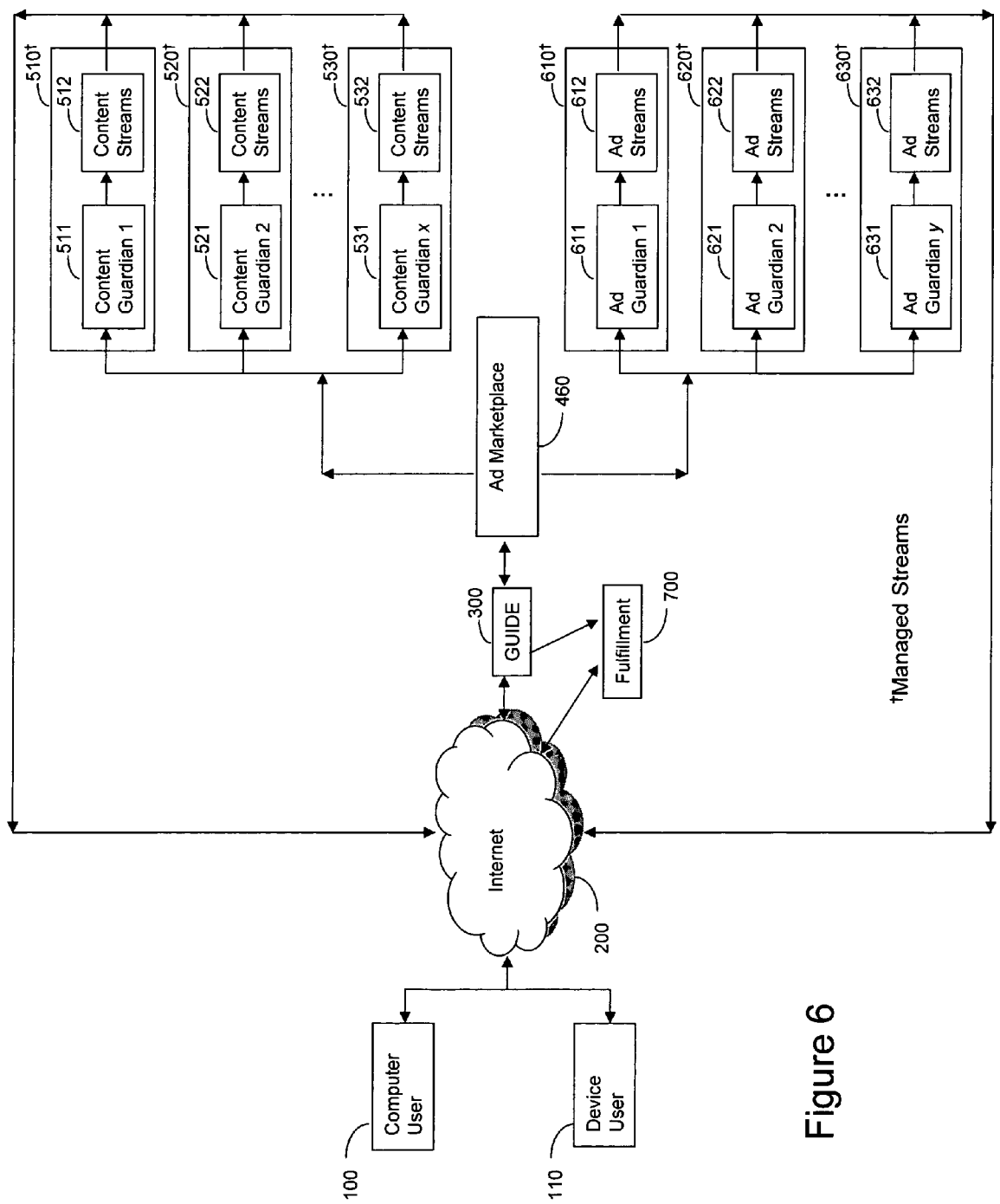
FIG. 6 is a diagram the system having users 100, 110, the Internet 200, the Guide 300, Ad Marketplace 460, a plurality of Managed Content 510, 520, 530 each with a single Content Guardian 511, 521, 531 respectively and Content Streams 512, 522, 532 respectively (each made up of a plurality of content streams), a plurality of Managed Ads 610, 620, 630 each with a single Ad Guardians 611, 621, 631 respectively and Ad Streams 612, 622, 632 respectively (each made up of a plurality of Ad streams), and Fulfillment 700.

FIG. 6 illustrates a further embodiment of the system. The characteristics of the individual components are nearly identical to those described in FIG. 4 except as shown, Ad Marketplace 460 and a plurality of Managed Content Streams 510, 520, 530 each of which has associated an Content Guardian 511, 521, 531 respectively and Content Streams 512, 522, 532 respectively.

Figure 12A:
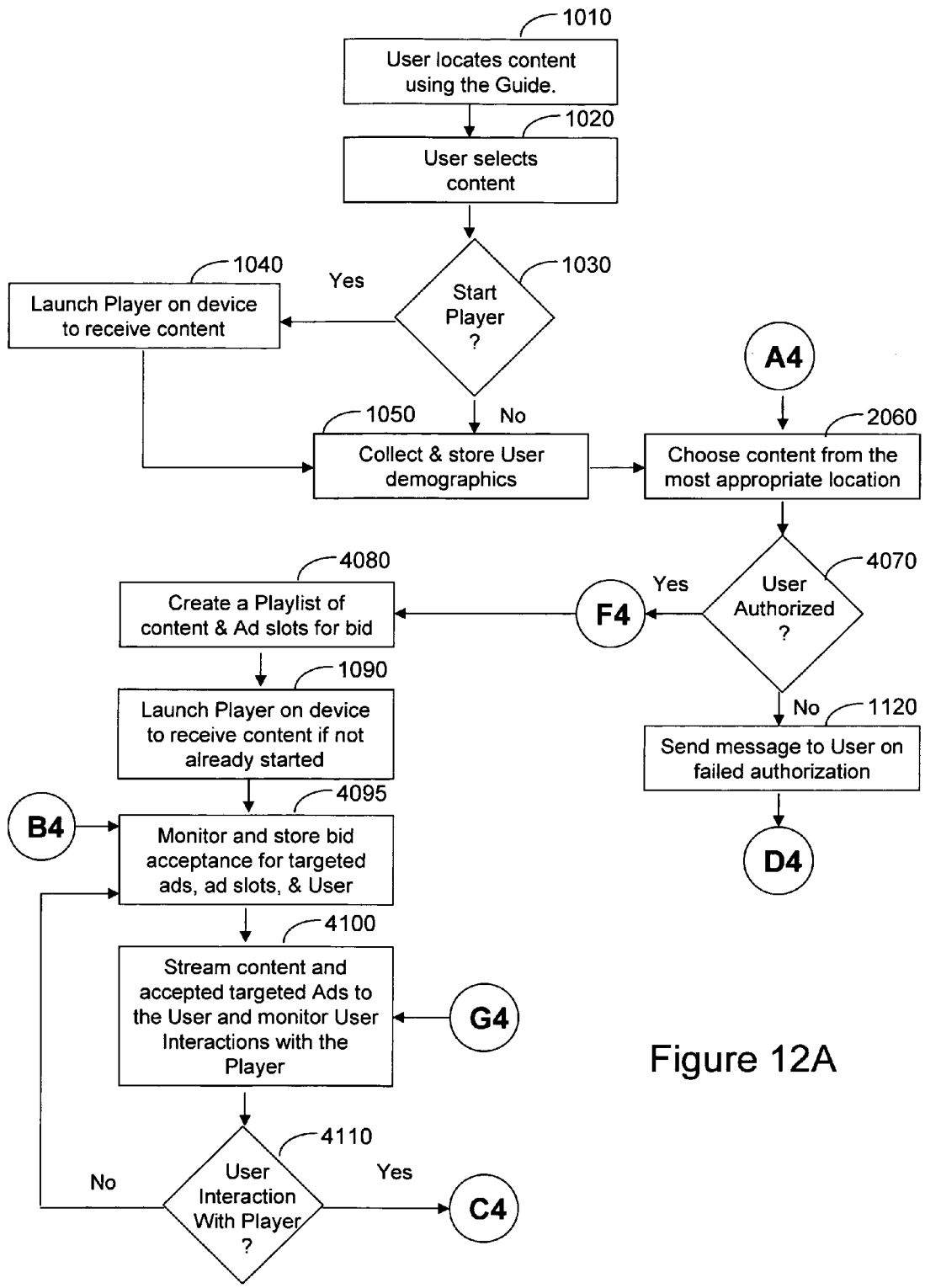
FIG. 12A outlines the steps of the process associated with users 100, 110 selections from a plurality of Content Streams 511, 522, 532 and a plurality of Ad Streams 612, 622, 632 using data from Guide 300 and Ad Marketplace 460. This figure is associated with the system shown in FIG. 6.
Figure 12B:
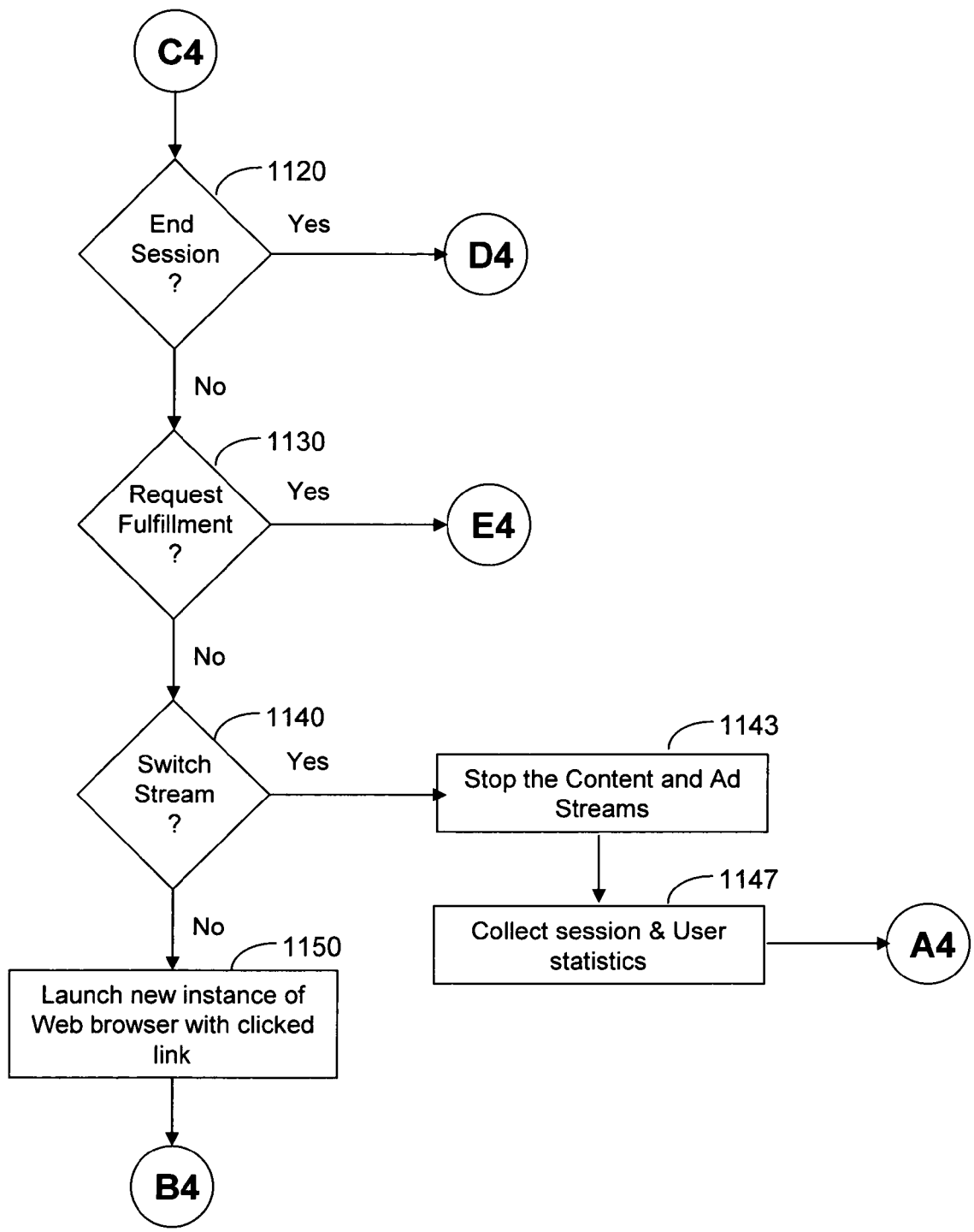
FIG. 12B is a continuation of the steps outlined in FIG. 12A. More specifically, it outlines the steps of the decision tree associated with users 100, 110 interactions with a content player. This figure is associated with the system shown in FIG. 6.
Figure 12C:
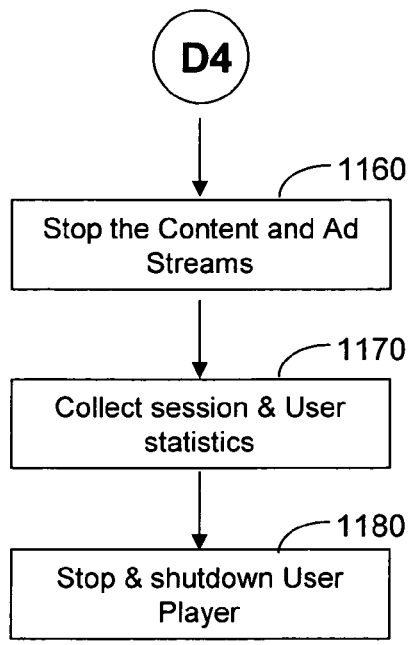
FIG. 12C is a continuation of the steps outlined in FIG. 12B. More specially, it outlines the steps associated with the user 100, 110 interactions for ending a streaming session. This figure is associated with the system shown in FIG. 6.
Figure 12D:
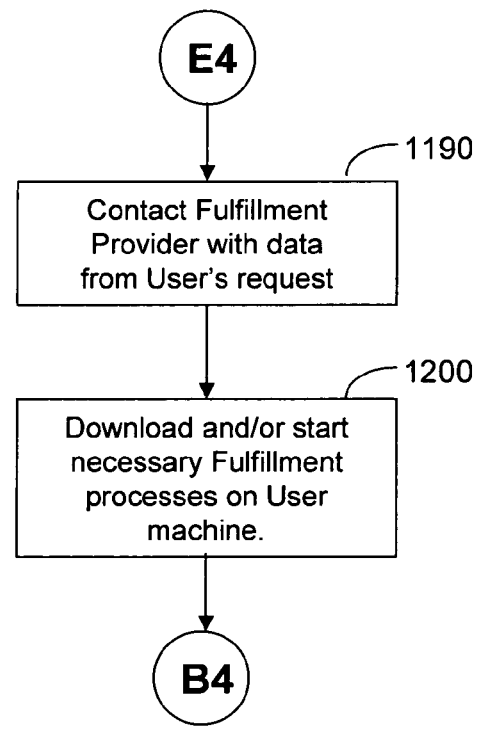
FIG. 12D is a continuation of the steps outlined in FIG. 12B. More specially, it outlines the steps associated with the user 100, 110 interactions for obtaining fulfillment of goods and services as presented within a player. This figure is associated with the system shown in FIG. 6.
Figure 12E:
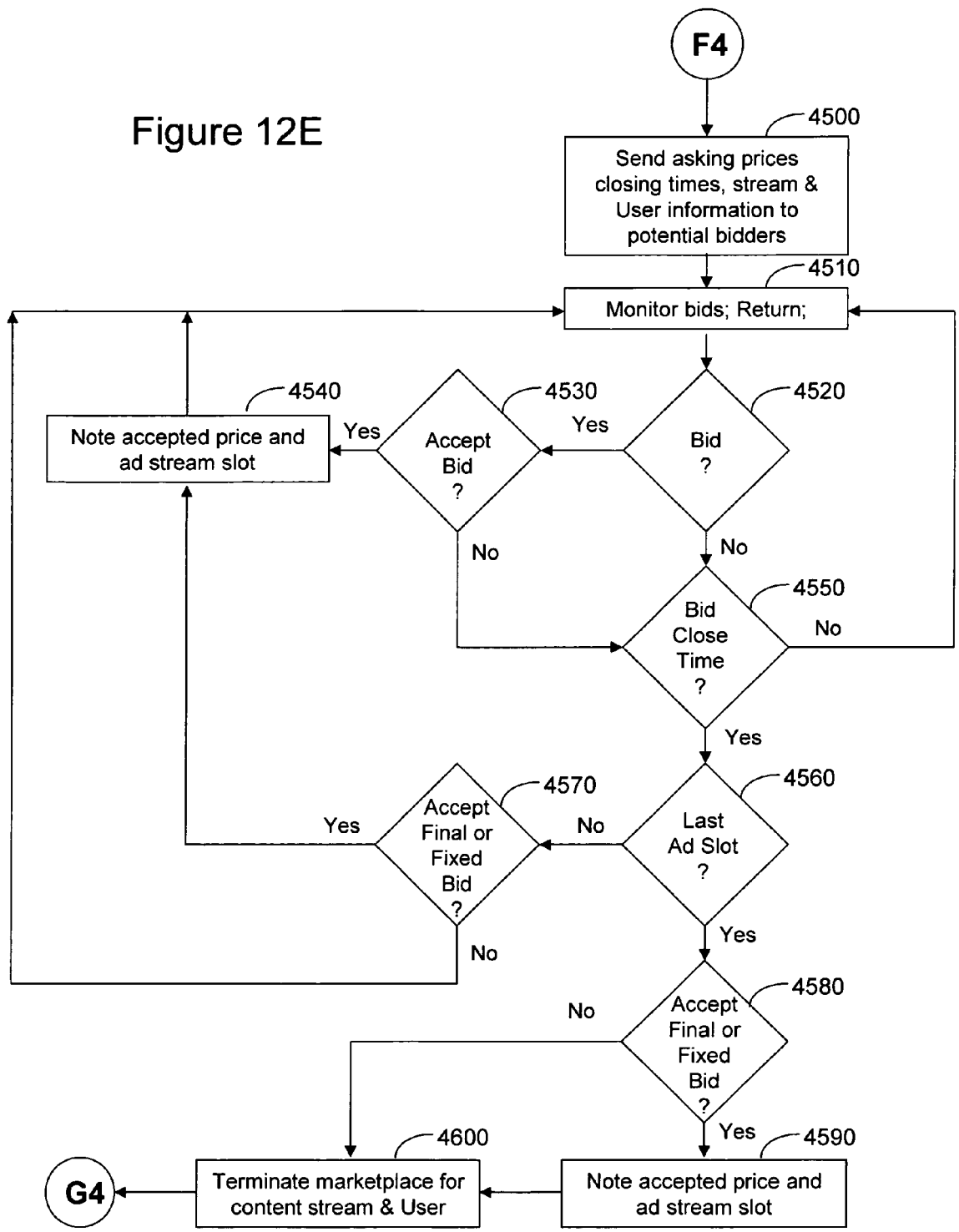
FIG. 12E is a continuation of the steps outlined in FIG. 12A. More specially, it outlines the steps associated with the playback of content streams from multiple Content Guardians 511, 521, 531 with ads from multiple Ad Guardians 611 621, 631 such that ad selection and placement determined through Ad Marketplace 460. This figure is associated with the system shown in FIG. 6.

FIGS. 12A-12E describe the steps and interactions involved with access and playback of a user selected content stream from a plurality of Managed Content Streams 510, 520, 530 and a plurality of Managed Ad Streams 610, 620, 630 as illustrated in FIG. 6. Steps in FIG. 12A are nearly identical to those described in FIG. 9A with the exception of steps 2060. Step 2060, however, is described in relation to the system illustrated in FIG. 2 and associated with the functional steps and interactions of creating a playlist with a single Ad Guardian 601. Therefore, Ad Marketplace functions and interactions are a combination of those associated in FIG. 2/FIGS. 8A-8D and in FIG. 4/FIGS. 10A-10E.

The above embodiments are only illustrative of the principles of this invention and are not intended to limit the invention to the particular embodiments described. One skilled in the art should recognize that services described may be deployed using one or more servers, on user devices, and in combination with other system components. In particular, it is contemplated that functional implementation of the invention described herein may be implemented equivalently in hardware, software, firmware, and/or other available functional components or building blocks. Accordingly, various modifications, adaptations, and combinations of various features of the described embodiments can be practiced without departing from the scope of the invention as set forth in the appended claims.

We claim:

1. A streaming content distribution system, comprising:
a server to a) stream content based on i) demographics and ii) historical and real time stream demographics from a plurality of streaming content sources and b) stream advertisements based on user demographics selected by advertisers, commercial agreements and access control rules from a plurality of streaming advertisement sources before, during, and after playback of streaming content from the server over the internet to a user device including a central processing unit and a physical user interface; and
a guide including metadata not input by the users for the user device to locate streaming content on the server.

2. The system of claim 1, wherein streaming content access and playback is controlled in real time by a plurality of independent or unified sources independent of the user.

3. The system of claim 1, wherein streaming advertising content access and playback is controlled in real time by a plurality of independent or unified sources independent of the user.

4. The system of claim 1, wherein streaming content playback is performed on a user device with network connectivity.

5. The system of claim 1, wherein user attributes selected from the group consisting of age, sex, location, occupation, income range or past listening habits are stored on the server collected automatically, by registration and/or directly by querying the user.

6. The system of claim 5, wherein content attributes selected from the group consisting of location of users best served, historical playback reliability, format of stream or date/time in which the stream is available are stored on the server.

7. The system of claim 5, wherein advertisement attributes that control ad stream access selected from the group consisting of ability to selectively have access to streams by user attributes, playback device type, content player attributes or commercial relationship are stored on the server.

8. The system of claim 1, wherein user selected streaming content and targeted streaming advertising is streamed for playback to the user.

9. The system of claim 1, wherein commercial fulfillment including the purchase, rental, request for information of goods and services are provided to the user during advertisement playback.

10. The system of claim 8, wherein there is monetary payment by advertisers for placing streaming advertising before, during, and after streaming content.

11. The system of claim 8, wherein the playback of streaming content and steaming advertisements is coordinated by a user device alone, on a sub-system independent of the user device, or in combination with the user device and a sub-system outside of the user device.

12. The system of claim 1, further comprising a first user accessing the server through a social networking platforms initiates a step selected from the group consisting of a) notify with a second user with what the first user is listening, viewing and interacting through the system, b) set a reminder with when selected content is available for listening, viewing, and/or interacting, c) notify a second user with when selected content is available for listening, viewing, and/or interacting, d) create and share commentary and rank selected content available for listening, viewing, and/or interacting or e) record and share with a second user with when selected content is available for listening, viewing, and/or interacting.

13. A method of streaming content distribution, comprising:
streaming content based on i) user demographics and ii) historical and real time stream demographics from a plurality of streaming content sources on a server;
streaming advertisements based on user demographics selected by advertisers, commercial agreements and access control rules from a plurality of streaming advertisement sources before, during, and after playback of streamed content from the server over the internet to a user device including a central processing unit and a physical user interface;
requesting streaming content by a user;
locating streaming content with a guide including metadata not input by the users; and
communicating bi-directionally with users.

14. The method of claim 13, further comprising playing back of targeted streaming content and targeted streaming advertisement by a user.

15. The method of claim 13, further comprising placing streaming advertisement on a streaming content stream with a marketplace.

16. The method of claim 15, further comprising placing steaming advertisement on the streaming content stream with an ask price.

17. The method of claim 15, further comprising placing streaming advertisement on the streaming content stream with multiple bid prices.

18. The method of claim 15, further comprising placing streaming advertisement on the streaming content stream with a selected winning bid.

* * * * *